United States Patent
Wang

(10) Patent No.: US 12,171,040 B2
(45) Date of Patent: Dec. 17, 2024

(54) EXTENSION OF A DISCONTINUOUS RECEPTION ACTIVE TIME

(71) Applicant: Telefonaktiebolaget LM Ericsson (publ), Stockholm (SE)

(72) Inventor: Min Wang, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 609 days.

(21) Appl. No.: 17/598,332

(22) PCT Filed: Mar. 26, 2020

(86) PCT No.: PCT/EP2020/058562
§ 371 (c)(1),
(2) Date: Sep. 27, 2021

(87) PCT Pub. No.: WO2020/193704
PCT Pub. Date: Oct. 1, 2020

(65) Prior Publication Data
US 2022/0191966 A1 Jun. 16, 2022

Related U.S. Application Data

(60) Provisional application No. 62/824,627, filed on Mar. 27, 2019.

(51) Int. Cl.
*H04W 76/28* (2018.01)
*H04W 16/14* (2009.01)
(Continued)

(52) U.S. Cl.
CPC ........... *H04W 76/28* (2018.02); *H04W 16/14* (2013.01); *H04W 52/0216* (2013.01); *H04W 74/0808* (2013.01)

(58) Field of Classification Search
CPC . H04W 76/28; H04W 16/14; H04W 52/0216; H04W 72/23; H04W 74/0808;
(Continued)

(56) References Cited

U.S. PATENT DOCUMENTS

2016/0255676 A1* 9/2016 Vajapeyam ........... H04W 16/14
2017/0265248 A1 9/2017 Narasimha et al.
(Continued)

FOREIGN PATENT DOCUMENTS

CN 102057734 A 5/2011
CN 106465451 A 2/2017
(Continued)

OTHER PUBLICATIONS

First Chinese Office Action for Chinese Application No. CN 202080022978.1 mailed Nov. 21, 2023, 17 pages (including English translation).
(Continued)

*Primary Examiner* — Nam T Huynh
(74) *Attorney, Agent, or Firm* — Sage Patent Group

(57) ABSTRACT

An aspect provides a method performed by a wireless device operating in a discontinuous reception, DRX, mode having an active state and a sleep state. The method includes, responsive to receiving downlink signaling from a base station indicative of an upcoming data burst during a channel occupancy time, and responsive to the wireless device meeting at least one condition, extending an active time of the DRX mode during which the wireless device is in the active state.

17 Claims, 13 Drawing Sheets

(51) Int. Cl.
*H04W 52/02* (2009.01)
*H04W 74/0808* (2024.01)

(58) Field of Classification Search
CPC ........... H04W 72/0446; H04W 74/006; H04W 74/0816; H04W 72/1268; H04W 72/21; H04W 72/04; H04W 74/004; H04W 72/56
See application file for complete search history.

(56) References Cited

U.S. PATENT DOCUMENTS

| | | |
|---|---|---|
| 2017/0359850 A1 | 12/2017 | Loehr |
| 2018/0181397 A1 | 6/2018 | Ostanevich et al. |
| 2018/0368164 A1 | 12/2018 | Lunden et al. |

FOREIGN PATENT DOCUMENTS

| | | |
|---|---|---|
| CN | 107431978 A | 12/2017 |
| CN | 107439030 A | 12/2017 |
| CN | 109479313 A | 3/2019 |
| WO | WO 2016164202 A1 | 10/2016 |

OTHER PUBLICATIONS

International Search Report and Written Opinion of the International Searching Authority, PCT/EP2020/058562, mailed Jul. 14, 2020, 9 pages.

Vivo, 3GPP TSG RAN WG1 Meeting #92, R1-1801557, Potential solutions and techniques for NR unlicensed spectrum, Athens, Greece, Feb. 26-Mar. 2, 2018, 6 pages.

3rd Generation Partnership Project, 3GPP TR 38.889 v16.0.0 (Dec. 2018), Technical Specification Group Radio Access Network; Study on NR-based access to unlicensed spectrum (Release 16), 119 pages.

3rd Generation Partnership Project, 3GPP TS 37.213 v16.0.0 (Dec. 2018), Technical Specification Group Radio Access Network; Physical layer procedures for shared spectrum channel access (Release 16), 25 pages.

\* cited by examiner

1402 — Transmitting, or causing to transmit, signalling to a wireless device comprising information indicating that the wireless device can extend an active time of a DRX mode responsive to the wireless device receiving downlink signalling indicative of an upcoming data burst during a channel occupancy time, and responsive to the wireless device meeting at least one condition

Fig. 14

Virtual Apparatus — 1500

Transmitting Unit — 1502

Fig. 15

EXTENSION OF A DISCONTINUOUS RECEPTION ACTIVE TIME

CROSS REFERENCE TO RELATED APPLICATIONS

This application is a 35 U.S.C. § 371 national stage application of PCT International Application No. PCT/EP2020/058562 filed on Mar. 26, 2020, which in turns claims domestic priority to U.S. Provisional Patent Application No. 62/824,627, filed on Mar. 27, 2019, the disclosures and content of which are incorporated by reference herein in their entirety.

TECHNICAL FIELD

This disclosure relates to discontinuous reception (DRX) by a wireless device, and in particular to changing a DRX active time for a wireless device.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Next generation systems may be expected to support a wide range of use cases and devices, with varying requirements ranging from fully mobile devices, to stationary Internet of Things (IoT) or fixed wireless broadband devices. The traffic pattern associated with many use cases is expected to consist of short or long bursts of data traffic with varying lengths of waiting period in-between. The waiting periods are herein referred to as an inactive state. In New Radio (NR), both license assisted access and standalone unlicensed operation are to be supported in 3GPP. Hence the procedure of Physical Random Access Channel (PRACH) transmission and/or a Scheduling Request (SR) transmission in unlicensed spectrum may be investigated in 3GPP. In the following, New Radio Unlicensed (NR-U) and channel access procedure for an unlicensed channel based on Listen Before Talk (LBT) is introduced.
NR-U Introduction In order to tackle the ever increasing data demand, NR is considered for both the licensed and unlicensed spectrum. Compared to the Long Term Evolution License Assisted Access (LTE LAA), NR-U may also need to support Dual Connectivity (DC) and standalone scenarios, where the Medium Access Control (MAC) procedures including Random Access Procedure (RACH) and scheduling procedure taking place on the unlicensed spectrum are subject to the LBT failures, whereas there was no such restriction in LTE LAA, since there was licensed spectrum in LAA scenario so the RACH and scheduling related signaling could be transmitted on the licensed spectrum instead of unlicensed spectrum.

For discovery reference signal (DRS) transmissions such as Primary Synchronization Signal (PSS) or Secondary Synchronization Signal (SSS), Physical Broadcast Channel (PBCH), Channel State Information Reference Signal (CSI-RS), control channel transmissions such as on the Physical Uplink Control Channel (PUCCH) or the Physical Downlink Control Channel (PDCCH), transmission on the physical data channels such as the Physical Uplink Shared Channel (PUSCH) of the Physical Downlink Shared Channel (PDSCH), and uplink sounding reference signals such as a Sounding Reference Signal (SRS) transmission, channel sensing may be applied to determine the channel availability before the physical signal is transmitted using the channel.

The Radio Resource Management (RRM) procedures in NR-U would be generally similar to those used in LAA, since NR-U is aiming to reuse LAA, enhanced-Licensed Assisted Access (eLAA) or further enhanced-Licensed Assisted Access (feLAA) technologies as much as possible to handle the coexistence between NR-U and other legacy Radio Access Technologies (RATs). Radio Resource Management (RRM) measurements and report comprising special configuration procedure with respect the channel sensing and channel availability.

Hence, channel access/selection for LAA was one of a number of important aspects for ensuring coexistence with other Radio Access Technologies (RATs) such as Wi-Fi. For instance, LAA aimed to use carriers that are congested with Wi-Fi.

In the licensed spectrum, a UE measures Reference Signal Received Power (RSRP), and Reference Signal Received Quality (RSRQ) of the downlink radio channel, and provides the measurement reports to its serving base station (eNB/gNB). However, these measurements do not reflect the interference strength on the carrier. Another metric Received Signal Strength Indicator (RSSI) can reflect the interference strength on the carrier. At the eNB/gNB side, it is possible to derive RSSI based on the received RSRP and RSRQ reports, however, this requires the RSRP and RSRQ reports to be available. Due to the LBT failure, some reports in terms of RSRP or RSRP may be blocked (either because the reference signal transmission (DRS) is blocked in the downlink or the measurement report itself is blocked in the uplink). Hence, direct measurements in terms of RSSI are very useful. The RSSI measurements together with the time information concerning when and how long for the UEs have made the measurements can assist the gNB/eNB to detect the hidden node. Additionally, the gNB/eNB can measure the load of the carrier which is useful for the network to prioritize some channels for load balancing and channel access failure avoidance purposes.

LTE LAA has been defined to support measurements of averaged RSSI and channel occupancy for measurement reports. The channel occupancy is defined as a percentage of time that RSSI was measured above a configured threshold. For this purpose, a RSSI measurement timing configuration (RMTC) includes a measurement duration (e.g. 1-5 milliseconds, ms) and a period between measurements (e.g. {40, 80, 160, 320, 640} ms).
Channel Access Procedure in NR Unlicensed Spectrum Listen-before-talk (LBT) is designed for the unlicensed spectrum to co-exist with other RATs. In this mechanism, a radio device applies a clear channel assessment (CCA) check (i.e. channel sensing) before any transmission. The transmitter involves energy detection (ED) over a time period compared to a certain threshold (ED threshold) in order to determine if a channel is idle. In case the channel is determined to be occupied, the transmitter performs a random back-off within a contention window before the next CCA attempt. In order to protect the acknowledgement (ACK) transmissions, the transmitter must defer a period after each busy CCA slot prior to resuming back-off. As soon as the transmitter has grasped access to a channel, the transmitter is only allowed to perform transmission up to a maximum time duration (namely, the maximum channel occupancy time (MCOT)). For Quality of Service (QoS) differentiation, a channel access priority based on the service type has been defined. For example, there are four LBT priority classes that are defined for differentiation of contention window sizes (CWS) and MCOT between services.

COT Sharing in NR-U

For a node (e.g., NR-U gNB/UE, LTE-LAA eNB/UE, or Wi-Fi AP/STA)) to be allowed to transmit in unlicensed spectrum (e.g., 5 GHz band) it typically needs to perform a clear channel assessment (CCA) as described above. This procedure typically includes sensing the medium to be idle for a number of time intervals. Sensing the medium to be idle can be done in different ways, e.g. using energy detection, preamble detection or using virtual carrier sensing. Where the latter implies that the node reads control information from other transmitting nodes informing when a transmission ends. After sensing the medium to be idle, the node is typically allowed to transmit for a certain amount of time, sometimes referred to as transmission opportunity (TXOP). The length of the TXOP depends on regulation and the type of CCA that has been performed, but typically ranges from 1 ms to 10 ms. This duration is often referred to as a COT (Channel Occupancy Time).

In Wi-Fi, feedback of data reception acknowledgements (ACKs) is transmitted without performing clear channel assessment. Preceding feedback transmission, a small time duration (called SIFS) is introduced between the data transmission and the corresponding feedback which does not include actual sensing of the channel. In 802.11, the SIFS period (16 microseconds, μs, for 5 GHz OFDM PHYs) is defined as:

aSIFSTime=aRxPHYDelay+aMACProcessingDelay+ aRxTxTurnaroundTime where aRxPHYDelay defines the duration needed by the Physical (PHY) layer to deliver a packet to the MAC layer, aMACProcessingDelay defines the duration that the MAC layer needs to trigger the PHY layer transmitting a response, and aRxTxTurnaroundTime defines the duration needed to turn the radio from reception into transmit mode.

Therefore, the SIFS duration is used to accommodate for the hardware delay to switch the direction from reception to transmission.

It is anticipated that for NR in unlicensed bands (NR-U), a similar gap to accommodate for the radio turnaround time will be allowed. For example, this will enable the transmission of PUCCH carrying Uplink Control Information (UCI) feedback as well as PUSCH carrying data and possible UCI within the same transmit opportunity (TXOP) acquired by the initiating gNB, without the UE performing clear channel assessment before PUSCH/PUCCH transmission as long as the gap between downlink (DL) and uplink (UL) transmission is less than or equal to 16 μs. Operation in this manner is typically called "COT sharing". An example is shown in FIG. 1, which shows transmission opportunities (TXOP) both with and without COT sharing where CCA is performed by the initiating node (gNB). For the case of COT sharing the gap between DL and UL transmission is less than 16 μs.

When a UE accesses a medium via, for example, category 4 LBT with a configured grant outside of a gNB COT, it is also possible for UE and gNB to share the UE acquired COT to schedule DL data to the same UE. The UE COT information can be indicated in UCI such as CG-UCI for configured grant PUSCH resources. An example on UE COT sharing is shown in FIG. 2, which is an example of a UE COT sharing with the DL transmission. For the case of COT sharing the gap between UL and DL transmission is less than 16 μs.

There currently exist certain challenge(s).

In the unlicensed system, data transmission interruption and latency may be incurred due to LBT operations, which may lead to service QoS degradation for a UE. Therefore, the COT sharing mechanism described above has been identified to be beneficial to reduce unnecessary LBT operations for NR-U. However, it is important that the gap between two consecutive transmission bursts must be less than a given time period in order to share a COT. For example, as described in the TR 38.889 V 16.0.0:

Within a gNB-initiated COT, an UL burst for a UE consisting of one or more of PUSCH, PUCCH, PRACH, and SRS follows the channel access schemes in Table 7.2.1.3.1-3.

TABLE 7.2.1.3.1-3

| Channel access schemes for a UL burst within a gNB-initiated COT as LBE device | | |
|---|---|---|
| Cat 1 Immediate transmission | Cat 2 LBT | Cat 4 LBT |
| When the gap from the end of the DL transmission to the beginning of the UL burst is not more than 16 msec. Note: Maximum limits of the duration of the UL burst other than those already derived from MCOT duration limits should be further discussed when specifications are developed. | For any of the following cases: When the gap between any two successive scheduled/granted transmissions in the COT is not greater than 25 msec For the case where a UL transmission in the gNB initiated COT is not followed by a DL transmission in the same COT Note: the duration from the start of the first transmission within the channel occupancy until the end of the last transmission in the same channel occupancy shall not exceed 20 ms. | N/A |

Note:
An UL burst is defined as a set of transmissions from a given UE having no gaps or gaps of no more than 16 μs. Transmissions from a UE having a gap of more than 16 μs are considered as separate UL bursts.

Equivalently, a DL burst may be defined as a set of transmissions from a given base station having no gaps or gaps of no more than 16 µs.

Based on above description, in order for a UE to perform an uplink transmission immediately within a gNB initiated COT, the gap between the beginning of UL data burst and the end of DL burst must be shorter than 16 µs.

The following may be implemented by a wireless device or UE in order to detect a DL transmission burst.

The UE may assume that the presence of a signal, such as the DMRS, in any downlink PDCCH or Group Common (GC) PDCCH (GC-PDCCH) transmission, to be indicative of an upcoming downlink transmission burst by the serving gNB. The UE may then enable power saving by not necessitating performing blind decodes to detect the transmission burst (Note: The power saving possibility by not necessitating blind decodes assumes performance relaxation for PDCCH decoding is not needed. Also, this does not mandate a two-step PDCCH decoding process for the UE with respect to DMRS detection).

The payload of a PDCCH and/or GC-PDCCH transmission may contain information regarding the COT structure that may then be used by the UE for power saving.

There may therefore be two aspects that are able to apply to enhance the UE power saving. The two aspects are concluded as below:

Aspect 1: the design of a shared COT concept is to allow a transmitter (either a UE or a gNB) to initiate a transmission without the UE (or eNB) performing clear channel assessment before transmission as long as the gap between two adjacent transmissions is less than or equal to 16 µs. For UEs in a shared COT, the UE needs to monitor PDCCHs more often to prepare for any potential transmission or reception. In other words, UEs that are not in a shared COT may not in principle need to monitor PDCCHs.

Aspect 2: with a signal such as the DMRS carried by a PDCCH or GC-PDCCH, the UE can detect if there is an upcoming DL transmission burst from the gNB associated with a COT. If there is a DL transmission burst presented or indicated by the DMRS or other downlink signaling, a UE may then monitor the PDCCH for potential DL data reception of the upcoming DL transmission burst. In other words, if there is not a DL transmission burst presented or indicated by a DMRS or other downlink signaling, the UE may not need to monitor PDCCH.

Discontinuous Reception (DRX) is a technique for reducing battery power consumption by UEs, in which the UE's receiver is switched off except during configured periods at configured intervals. Operating in a DRX mode comprises switching between an active (or 'on') state in which the UE's receiver is switched on, and a sleep (or 'off') state in which the UE's receiver is switched off. For a DRX cycle, the duration of the active state and the duration of the sleep state are (independently) configurable, and the DRX cycle length is defined as the sum of the durations of the active state and the sleep state within the DRX cycle.

The following statements may be true for Discontinuous Reception (DRX) mode in NR-U. The DRX On-duration may start as in Rel-15 NR (except for potentially to have a new switch trigger to go to short DRX, i.e. where the 'Off-duration' is shortened). There may be one DRX configuration for one MAC entity (no change). The DRX active time may be extended, or go to short DRX, by a non-data DL transmission (however, which is not a Wake Up Signal (WUS), which has been defined for Machine Type Communications (MTC) and NB-IOT battery saving in LTE).

SUMMARY

It may therefore be beneficial to determine whether or not the DRX active time needs to be extended based on detection of a DL signalling indicating an upcoming data burst. Extending the DRX active time typically means that the proportion of time that the UE is in the active state is increased. Therefore extending the DRX active time can include any of: extending the duration of the DRX active time while maintaining the duration of the DRX sleep time (which will lead to a longer DRX cycle length), extending the duration of the DRX active time while shortening the duration of the DRX sleep time (which can be used to maintain the same DRX cycle length), or the duration DRX active time can be maintained while shortening the duration of the DRX sleep time (which will lead to a shorter DRX cycle length).

For example it may be unnecessary for all UEs in the cell/bandwidth part (BWP) to extend their DRX active time, because it may be that only some of the UEs are able to be scheduled within the COT period due to limits on the system capacity. Otherwise, there would be a risk of an increase in power consumption for those UEs that are not able to be scheduled.

Certain aspects of the present disclosure and their embodiments may provide solutions to these or other challenges.

There is provided a method for a wireless device to determine whether to extend its discontinuous reception (DRX) mode active time. In particular, the method may be performed upon receipt of a DL signal indicating upcoming transmission of a downlink data burst. With the proposed method, only a subset of UEs that are potentially going to be scheduled with the COT in the system adjust or extend their DRX active time or DRX configuration. In this way, a good balance between UE power saving and better service Quality of Service (QoS) guarantee is achieved.

There are, proposed herein, various embodiments which address one or more of the issues disclosed herein.

According to a first aspect, there is provided a method performed by a wireless device operating in a discontinuous reception, DRX, mode having an active state and a sleep state. The method comprises: responsive to receiving downlink signaling from a base station indicative of an upcoming data burst during a channel occupancy time, and responsive to the wireless device meeting at least one condition, extending an active time of the DRX mode during which the wireless device is in the active state.

According to a second aspect, there is provided a method performed by a base station. The method comprises: transmitting, or causing to transmit, signaling to a wireless device, wherein the signaling includes or comprises information indicating that the wireless device can extend an active time of a DRX mode responsive to the wireless device receiving downlink signaling from the base station or another base station indicative of an upcoming data burst during a channel occupancy time, and responsive to the wireless device meeting at least one condition.

According to a third aspect, there is provided a wireless device configured to operate in a discontinuous reception, DRX, mode. The wireless device comprises: processing circuitry configured to: responsive to receiving downlink signaling from a base station indicative of an upcoming data burst during a channel occupancy time, and responsive to the wireless device meeting at least one condition, extend an active time of the DRX mode during which the wireless device is in the active state; and power supply circuitry configured to supply power to the wireless device.

According to a fourth aspect, there is provided a base station. The base station comprises: processing circuitry configured to: transmit, or cause to transmit, signaling to a wireless device, wherein the signaling includes or comprises information indicating that the wireless device can extend an active time of a DRX mode responsive to the wireless device receiving downlink signaling from the base station or another base station indicative of an upcoming data burst during a channel occupancy time, and responsive to the wireless device meeting at least one condition, and power supply circuitry configured to supply power to the base station.

According to a fifth aspect, there is provided a wireless device for operating in a discontinuous reception, DRX, mode. The wireless device is configured to, responsive to receiving downlink signaling from a base station indicative of an upcoming data burst during a channel occupancy time, and responsive to the wireless device meeting at least one condition, extend an active time of the DRX mode during which the wireless device is in the active state; and power supply circuitry configured to supply power to the wireless device.

According to a sixth aspect, there is provided a base station configured to transmit, or cause to transmit, signaling to a wireless device, wherein the signaling includes or comprises information indicating that the wireless device can extend an active time of a DRX mode responsive to the wireless device receiving downlink signaling from the base station or another base station indicative of an upcoming data burst during a channel occupancy time, and responsive to the wireless device meeting at least one condition, and power supply circuitry configured to supply power to the base station.

According to a seventh aspect, there is provided a computer program product comprising a computer readable medium having computer readable code embodied therein, the computer readable code being configured such that, on execution by a suitable computer or processor, the computer or processor is caused to perform the method of the first aspect, the second aspect, or any embodiment thereof.

Certain of the above embodiments and the embodiments disclosed herein may provide one or more of the following technical advantage(s).

A wireless device with potential data transmission or reception need may adapt its DRX configuration for best power saving prior to start of a COT period initiated by the base station. Furthermore, a good balance between UE power saving and better service QoS guarantee is achieved.

BRIEF DESCRIPTION OF THE DRAWINGS

Some of the embodiments contemplated herein will now be described more fully with reference to the accompanying drawings, in which:

FIG. 14 illustrates a method in accordance with some embodiments; and

FIG. 15 illustrates a virtualization apparatus in accordance with some embodiments.

DETAILED DESCRIPTION

Figure 1:
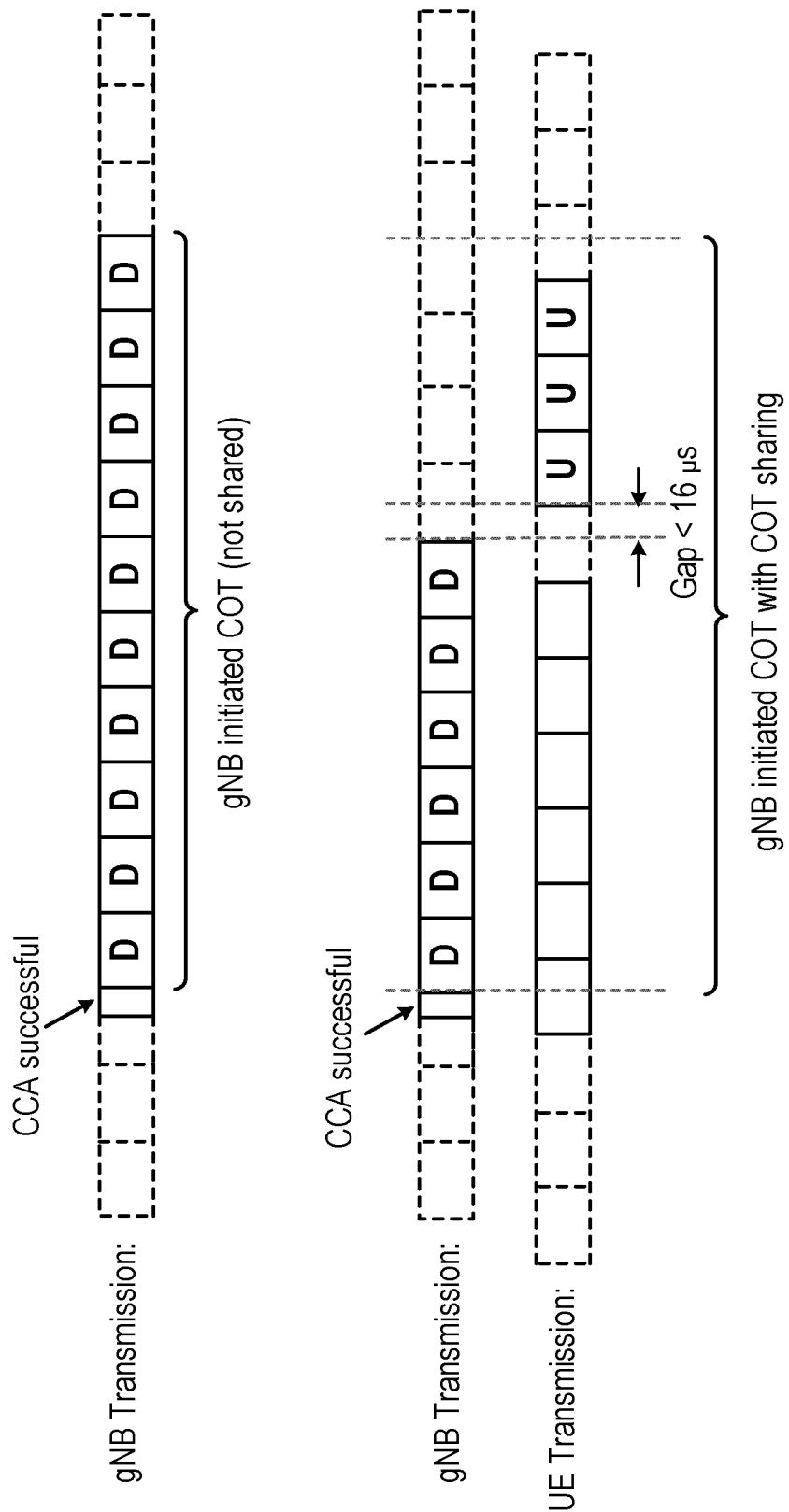
FIG. 1 illustrates transmission opportunities (TXOP) both with and without COT sharing.
Figure 2:
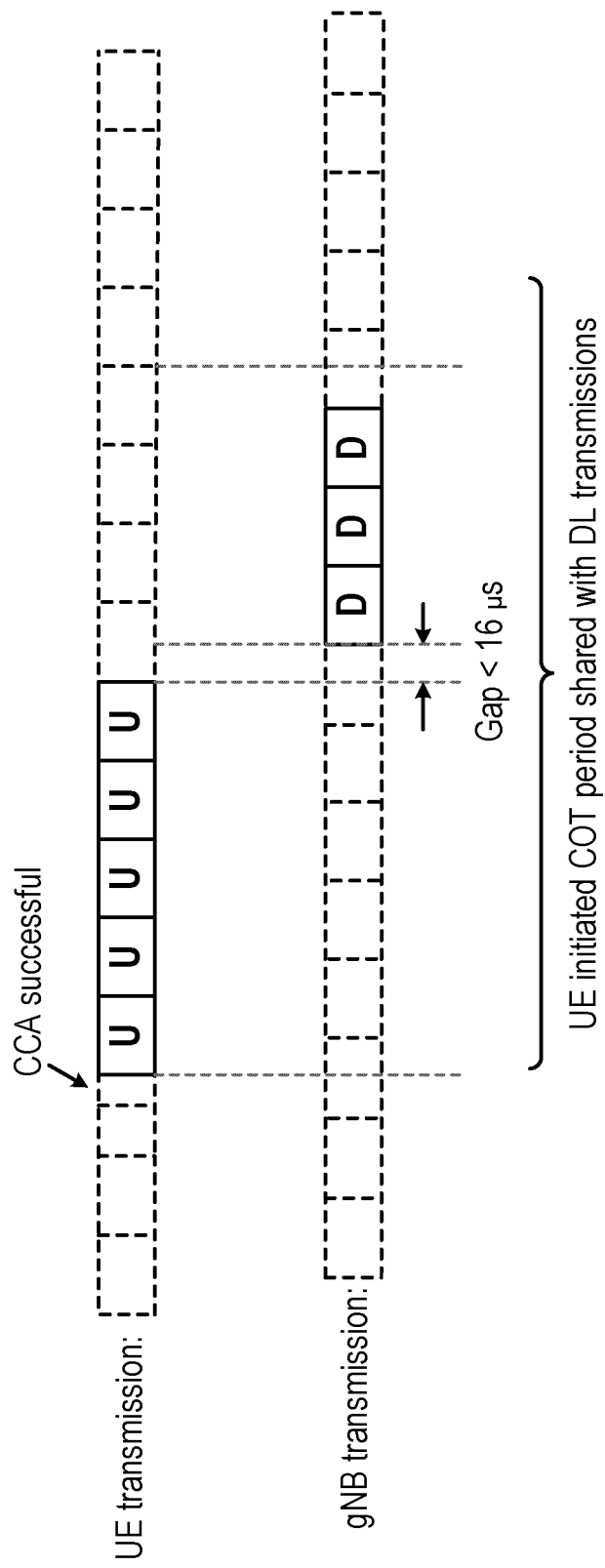
FIG. 2 illustrates a UE COT sharing with a DL transmission.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The below embodiments are described in the context of NR unlicensed spectrum (NR-U). However, embodiments described herein are not limited to NR-U scenarios. They may also applicable to other unlicensed operation scenarios such as LTE LAA/eLAA/feLAA.

As noted above, in DRX, a UE's receiver is switched off (powered off/deactivated) except during configured periods at configured intervals. Operating in a DRX mode comprises switching between an active (or 'on') state in which the UE's receiver is switched on, and a sleep (or 'off') state in which the UE's receiver is switched off. The duration of the active state and the duration of the sleep state are (independently) configurable, and the DRX cycle length is defined as the sum of the durations of the active state and the sleep state.

According to some embodiments, there is provided a method performed by a wireless device operating in a discontinuous reception, DRX, mode having an active state and a sleep state, the method comprising: responsive to receiving downlink signaling from a base station indicative of an upcoming data burst during a channel occupancy time, and responsive to the wireless device meeting at least one condition, extending an active time of the DRX mode during which the wireless device is in the active state.

Thus, the downlink signaling from the base station (e.g. gNB) indicates that the base station will transmit data to the wireless device following that downlink signaling. The upcoming data burst is downlink data that will be transmitted to the wireless device.

As noted above, the channel occupancy time (COT) is the amount of time that a node is typically allowed to transmit after sensing the transmission medium to be idle. COT signaling (such as GC-PDCCH based signaling) can indicate when the COT starts, and/or when the COT ends. The COT signaling information and/or the DL signaling information indicating a coming data burst may be carried in the same signaling message, or in different signaling messages.

Also as noted above, extending the DRX active time means increasing the proportion of time that the UE is in the active state relative to the sleep state. Therefore extending the DRX active time can include any of: extending the duration of the DRX active time while maintaining the duration of the DRX sleep time (which will lead to a longer DRX cycle length), extending the duration of the DRX active time while shortening the duration of the DRX sleep time by a corresponding amount (which will maintain the same DRX cycle length), or the duration DRX active time can be maintained while shortening the duration of the DRX sleep time (which will lead to a shorter DRX cycle length). If, responsive to receiving the downlink signaling from the base station indicative of the upcoming data burst during a COT, none of the one or more conditions is met, then the active time of the DRX mode is not extended. In this case, there is no change to the DRX cycle length, or the durations of the DRX active time or DRX sleep time.

In embodiments where there is just one condition, the active time of the DRX mode is extended if the wireless device meets that condition and downlink signaling is received from the base station indicative of an upcoming data burst during a COT.

In embodiments where there are two or more conditions, it is sufficient for one or more of the conditions to be met for the active time of the DRX mode to be extended if downlink signaling is received from the base station indicative of an upcoming data burst during a COT.

The at least one condition may comprise a first condition that is met when the wireless device has not been scheduled for data transmission or reception for a first predetermined time period (e.g., after the last transmission or the reception of data by the wireless device, the wireless device has not been scheduled over X seconds), and either the wireless device has first uplink data ready for transmission (for example, in a buffer), or the wireless device estimates that there is first downlink data ready for reception from the base station (for example, based on known traffic pattern or based on a prediction). In this first condition, a timer may be introduced for defining the first predetermined time period accordingly. The length of the first predetermined time period (i.e. the value of X) may be configured based on a service type. For a service with a critical latency requirement, X can be set with a low value such as of the order of 100 ms, while for a service with a non-critical latency requirement, X can be set with a high value such as in the order of seconds. The value of X may be also set depending on the system load. A low value is set in case of low or medium system load, while a high value is set in case high system load.

The at least one condition may comprise a second condition that is met when the wireless device has transmitted second uplink data to the base station and there is a pending downlink acknowledgment from the base station of the transmitted second uplink data. In an alternative embodiment of the second condition, the second condition is met when the wireless device has transmitted second uplink data to the base station within a second predetermined time period and received no downlink acknowledgement from the base station of the transmitted second uplink data.

The at least one condition may comprise a third condition that is met when the wireless device has received third downlink data from the base station (for example recently) and there is a pending uplink acknowledgment of the received third downlink data for the wireless device to transmit. In an alternative embodiment of the third condition, the third condition is met when the wireless device has received third downlink data from the base station within a third predetermined time period (for example recently) and there is a pending uplink acknowledgment of the received third downlink data for the wireless device to transmit.

The at least one condition may comprise a fourth condition that is met when the wireless device has been triggered for Radio Resource Control (RRC) signaling. For example, the wireless device may have been triggered for RRC signaling due to mobility or reconfiguration needs and pending for transmission or reception. In an example, the fourth condition is met when a specific measurement event is fulfilled, and the UE needs to provide a measurement report accordingly via RRC signaling.

The at least one condition may comprise a fifth condition that is met when the wireless device has opportunities or occasions for uplink control signaling transmissions or downlink control signaling receptions during the channel occupancy time. In an example, the fifth condition is met when a wireless device is configured with PUCCH resources (frequency domain and time domain), and the wireless device can transmit PUCCH signaling using those configured PUCCH resources.

The at least one condition may comprise a sixth condition that is met when the wireless device belongs to a preconfigured group of wireless devices associated with the channel occupancy time. A group can be configured containing specific wireless devices. The sixth condition can be met where a base station (e.g. gNB) signals that the channel occupancy time is associated with that group.

The at least one condition may comprise a seventh condition that is met when the wireless device has a pending data transmission of a service or traffic type associated with the channel occupancy time. For example, the COT may be planned to serve the data transmission or reception for that service/traffic type. The service associated with a COT could be a delay sensitive service such as a video call. The base station (e.g. gNB) may signal the service type/priority indicator associated with the service in the COT information. Different services may require different channel occupancy time lengths to fulfil the QoS requirement.

The at least one condition may comprise an eighth condition that is met when the wireless device was unable to be scheduled for data transmission or reception during a last channel occupancy time. The base station (e.g. gNB) may signal this in the COT information-related signaling message for example, GC-PDCCH.

The at least one condition may comprise a ninth condition that is met when a channel access category and/or channel access priority class associated with wireless device data to be transmitted is the same as a channel access category and/or channel access priority class associated with the channel occupancy time. In other words, the channel access category and/or channel access priority class and/or Quality of Service (QoS) class identifier (e.g., QCI in LTE, and 5QI in NR) associated with the UE data is mapping to the channel access category and/or channel access priority class and/or QoS class identifier (e.g., QCI in LTE, and 5QI in NR) associated with the COT. As specified in 3GPP TS 37.213 v16.0.0, a UE can access a channel on which uplink (UL) transmission(s) are performed according to one of Type 1 or Type 2 UL channel access procedures. Type 1 channel access procedures are described in sub-clause 4.2.1.1. Type 2 channel access procedures are described in sub-clause 4.2.1.2. Different categories of channel access schemes can be used.

The at least one condition may comprise a tenth condition that is met when an identity of the wireless device is associated with the channel occupancy time. In other words, the wireless device ID (such as C-RNTI) may be determined to be relevant to the COT. The determination may be made via explicit signaling (such as Downlink Control Information (DCI), or Medium Access Control Control Element (MAC CE), or Radio Resource Control (RRC) signaling) or in an implicit fashion, such as the wireless device may be assigned to a COT which starts at a predefined time position, i.e., at a slot with an even index, while another wireless device may be assigned to a COT which starts at a slot with an odd index. In another example, the wireless device ID is assigned to a COT if the COT period is above a configured time period, meaning that the coming COT has sufficient resources in the time domain. The configured time period could be a certain number of time slots, which is sufficiently long enough to serve the data transmission for one or more wireless devices.

The at least one condition may comprise an eleventh condition that is met when a measured channel occupancy or a number of listen before talk (LBT) failures is below a configured threshold. A LBT failure occurs when the channel is determined to be busy by the wireless device. In other words, upon detection of DL signaling indicating a coming DL data burst associated with a COT period, a wireless device may determine to extend its DRX active time when the measured channel occupancy or the number of occurrences of LBT failures is below a configured threshold, meaning that the system (cell, bandwidth part (BWP), subband or channel) has a low load, so that all or most wireless devices in the system can be quickly serviced within a short time period. The configured threshold can be an absolute number, such as 10, 20, or a percentage such as 10%, 20% etc. This also means the function of the extension of DRX active time can be enabled or disabled dynamically. The enabling or disabling may require additional signaling, such as a RRC signaling message, a MAC CE or a DCI signaling.

The step of extending the active time of the DRX mode may comprise starting or restarting a first timer indicating a number of consecutive subframes for which the wireless device should be in the active state after receiving the downlink signaling. For example, the step of extending the active time of the DRX mode may comprise starting or restarting of the drx-InactivityTimer.

The step of extending the active time of the DRX mode may comprise; responsive to the wireless device operating in a longer DRX cycle when receiving the downlink signaling indicative of an upcoming data burst, switching from the longer DRX cycle to a shorter DRX cycle.

The step of extending the active time of the DRX mode may comprise applying a DRX configuration having a longer or more frequent second timer specifying a number of subframes for which the wireless device is in the active state for each DRX cycle. A 'more frequent second timer' means that the wireless device has more frequent (shorter) DRX cycles. For example, the step of extending the active time of the DRX mode may comprise applying a different DRX configuration with a more frequent or longer drx-onDurationTimer. The NR RRC specifications define a number of different possible values for the active time (e.g. 1 ms, 2 ms, 3 ms, 4 ms, 5 ms, 6 ms, 8 ms, 10 ms, 20 ms, 30 ms, 40 ms, 50 ms, 60 ms, 80 ms, 100 ms, 200 ms, 300 ms, 400 ms, 500 ms, 600 ms, 800 ms, 1000 ms, 1200 ms, 1600 ms), and extending the active time can comprise selecting a larger value for the active time from the available values.

The step of extending the active time of the DRX mode may comprise remaining in the active state for the duration of the channel occupancy time. For example, the wireless device may keep its DL PDCCH monitoring to be always active during the COT period.

The step of extending the active time of the DRX mode may comprise remaining in the active state for the duration of a third timer that starts in response to receiving the downlink signaling indicative of the upcoming data burst. For example, a new timer may be introduced into the DRX configuration, which defines the time period that the UE shall continue to keep its DL monitoring to be active after the detection of the DL signal indicating a coming data burst and the wireless device meeting the at least one condition. The third (new) timer may have a duration related to the COT, e.g. the third timer duration can be half the COT.

The step of extending the active time of the DRX mode may comprise extending the active time up to a configured maximum time. For example, upon detection of DL signaling indicating a coming data burst associated with (i.e. during) a COT period, a UE may be configured to extend its DRX active time for up to a configured time, or up to a configured maximum time period. The maximum time/period can be defined in terms of a number of slots. If there is no scheduling assignment or UL grant received by the UE, the UE may stop the extension of its DRX active time, or switch back to the ordinary DRX configuration or switch back to long DRX cycle if the UE is in short DRX cycle.

The channel occupancy time may be initiated by a base station or a wireless device. That is, the base station or wireless device (as appropriate) can perform channel sensing, and if the channel is idle, the base station or wireless device (as appropriate) starts transmission during the COT. For example, the detected (i.e. upcoming) data burst may be associated to a COT, initiated by a base station or initiated by a wireless device and shared with the base station and other wireless devices. For both cases, the base station may transmit a DL signaling indicating transmission of the data burst.

The downlink signaling from a base station indicative of an upcoming data burst during a channel occupancy time may comprise a demodulation reference signal.

The function of the extension of DRX active time upon detection of a coming data burst may be configured per UE, or service, or per cell/carrier/BWP/sub-band/channel basis. The configuration can be signaled to the UE by the base station (e.g. gNB) via signaling such as RRC signaling, a MAC control element (CE) or DCI. A new UE capability bit may be also introduced, that is preconfigured or stored at the UE (e.g. in the SIM card). The capability bit indicates the capability of the UE to extend the DRX active time as described herein. The base station may send a message (e.g. a RRC message) to the wireless device to query the capabilities of the wireless device. The wireless device can respond with its capability information.

Thus, in various embodiments, the wireless device can be configured to receive signaling from a base station indicating that the wireless device can extend an active time of a DRX mode responsive to the wireless device receiving downlink signaling from the base station or another base station indicative of an upcoming data burst during a channel occupancy time, and responsive to the wireless device meeting at least one condition. In some embodiments the wireless device can be configured to receive signaling indicating the condition(s) to be met by the wireless device from the base station, for example in the downlink signaling that indicates an upcoming data burst.

In this respect, there is also provided a method performed by a base station, the method comprising transmitting, or causing to transmit, signaling to a wireless device, wherein the signaling includes or comprises information indicating that the wireless device can extend an active time of a DRX mode responsive to the wireless device receiving downlink signaling from the base station or another base station indicative of an upcoming data burst during a channel occupancy time, and responsive to the wireless device meeting at least one condition. As noted above, the base station may signal the condition(s) to be met by the wireless device to the wireless device, for example in the downlink signaling that indicates an upcoming data burst. Where appropriate for the signaled condition, such signaling may also indicate a threshold or period applicable to the condition.

Also as noted above with respect to the tenth condition, the base station may signal an identity or identities of wireless devices that the COT is associated with.

Figure 3:
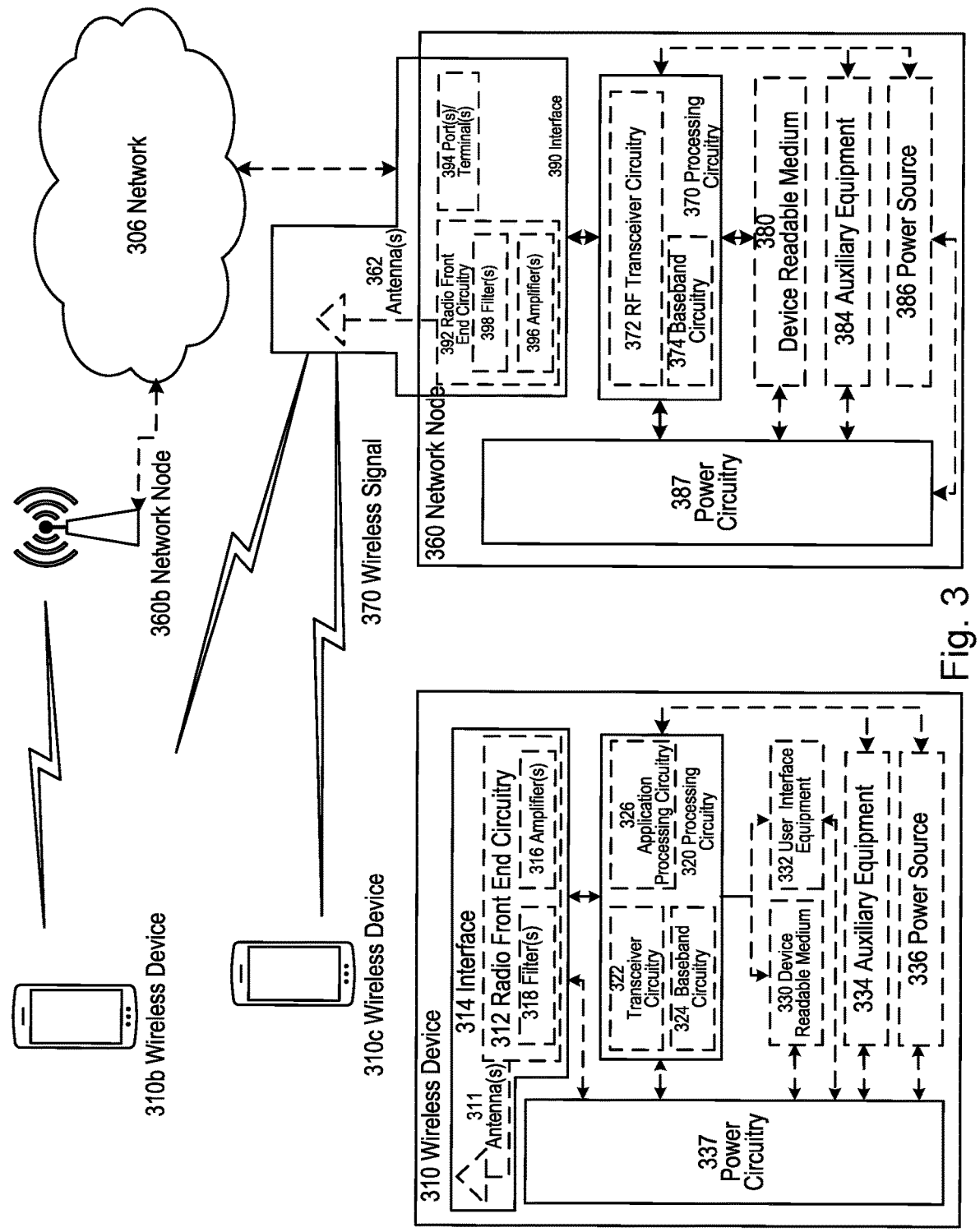
FIG. 3 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 306, network nodes 360 and 360b, and WDs 310, 310b, and 310c. In practice, a wireless network may further include any additional elements suitable to support communication between wireless devices or between a wireless device and another communication device, such as a landline telephone, a service provider, or any other network node or end device. Of the illustrated components, network node 360 and wireless device (WD) 310 are depicted with additional detail. The wireless device 310 may be a wireless device as described in the embodiments above. The network node may be a base station (e.g. a gNB) as described in the embodiments above. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 360 and WD 310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 360 includes processing circuitry 370, device readable medium 380, interface 390, auxiliary equipment 384, power source 386, power circuitry 387, and antenna 362. Although network node 360 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 360 are depicted as single boxes located within a larger box, or nested within multiple boxes, in practice, a network node may comprise multiple different physical components that make up a single illustrated component (e.g., device readable medium 380 may comprise multiple separate hard drives as well as multiple RAM modules).

Similarly, network node 360 may be composed of multiple physically separate components (e.g., a NodeB component and a RNC component, or a BTS component and a BSC component, etc.), which may each have their own respective components. In certain scenarios in which network node 360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 360 may be configured to support multiple radio access technologies (RATs). In such embodiments, some components may be duplicated (e.g., separate device readable medium 380 for the different RATs) and some components may be reused (e.g., the same antenna 362 may be shared by the RATs). Network node 360 may also include multiple sets of the various illustrated components for different wireless technologies integrated into network node 360, such as, for example, GSM, WCDMA, LTE, NR, WiFi, or Bluetooth wireless technologies. These wireless technologies may be integrated into the same or different chip or set of chips and other components within network node 360.

Processing circuitry 370 is configured to perform any determining, calculating, or similar operations (e.g., certain obtaining operations) described herein as being provided by a network node. These operations performed by processing circuitry 370 may include processing information obtained by processing circuitry 370 by, for example, converting the obtained information into other information, comparing the obtained information or converted information to information stored in the network node, and/or performing one or more operations based on the obtained information or converted information, and as a result of said processing making a determination.

Processing circuitry 370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 360 components, such as device readable medium 380, network node 360 functionality. For example, processing circuitry 370 may execute instructions stored in device readable medium 380 or in memory within processing circuitry 370. Such functionality may include providing any of the various wireless features, functions, or benefits discussed herein. In some embodiments, processing circuitry 370 may include a system on a chip (SOC).

In some embodiments, processing circuitry 370 may include one or more of radio frequency (RF) transceiver circuitry 372 and baseband processing circuitry 374. In some embodiments, radio frequency (RF) transceiver circuitry 372 and baseband processing circuitry 374 may be on separate chips (or sets of chips), boards, or units, such as radio units and digital units. In alternative embodiments, part or all of RF transceiver circuitry 372 and baseband processing circuitry 374 may be on the same chip or set of chips, boards, or units In certain embodiments, some or all of the functionality described herein as being provided by a network node, base station, eNB or other such network device may be performed by processing circuitry 370 executing instructions stored on device readable medium 380 or memory within processing circuitry 370. In alternative embodiments, some or all of the functionality may be provided by processing circuitry 370 without executing instructions stored on a separate or discrete device readable medium, such as in a hard-wired manner. In any of those embodiments, whether executing instructions stored on a device readable storage medium or not, processing circuitry 370 can be configured to perform the described functionality. The benefits provided by such functionality are not limited to processing circuitry 370 alone or to other components of network node 360, but are enjoyed by network node 360 as a whole, and/or by end users and the wireless network generally.

Device readable medium 380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 370. Device readable medium 380 may store any suitable instructions, data or information, including a computer program, software, an application including one or more of logic, rules, code, tables, etc. and/or other instructions capable of being executed by processing circuitry 370 and, utilized by network node 360. Device readable medium 380 may be used to store any calculations made by processing circuitry 370 and/or any data received via interface 390. In some embodiments, processing circuitry 370 and device readable medium 380 may be considered to be integrated.

Interface 390 is used in the wired or wireless communication of signalling and/or data between network node 360, network 306, and/or WDs 310. As illustrated, interface 390 comprises port(s)/terminal(s) 394 to send and receive data, for example to and from network 306 over a wired connection. Interface 390 also includes radio front end circuitry 392 that may be coupled to, or in certain embodiments a part of, antenna 362. Radio front end circuitry 392 comprises filters 398 and amplifiers 396. Radio front end circuitry 392 may be connected to antenna 362 and processing circuitry 370. Radio front end circuitry may be configured to condition signals communicated between antenna 362 and processing circuitry 370. Radio front end circuitry 392 may receive digital data that is to be sent out to other network nodes or WDs via a wireless connection. Radio front end circuitry 392 may convert the digital data into a radio signal having the appropriate channel and bandwidth parameters using a combination of filters 398 and/or amplifiers 396. The radio signal may then be transmitted via antenna 362. Similarly, when receiving data, antenna 362 may collect radio signals which are then converted into digital data by radio front end circuitry 392. The digital data may be passed to processing circuitry 370. In other embodiments, the interface may comprise different components and/or different combinations of components.

In certain alternative embodiments, network node 360 may not include separate radio front end circuitry 392, instead, processing circuitry 370 may comprise radio front end circuitry and may be connected to antenna 362 without separate radio front end circuitry 392. Similarly, in some embodiments, all or some of RF transceiver circuitry 372 may be considered a part of interface 390. In still other embodiments, interface 390 may include one or more ports or terminals 394, radio front end circuitry 392, and RF transceiver circuitry 372, as part of a radio unit (not shown), and interface 390 may communicate with baseband processing circuitry 374, which is part of a digital unit (not shown).

Antenna 362 may include one or more antennas, or antenna arrays, configured to send and/or receive wireless signals. Antenna 362 may be coupled to radio front end circuitry 390 and may be any type of antenna capable of transmitting and receiving data and/or signals wirelessly. In some embodiments, antenna 362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 362 may be separate from network node 360 and may be connectable to network node 360 through an interface or port.

Antenna 362, interface 390, and/or processing circuitry 370 may be configured to perform any receiving operations and/or certain obtaining operations described herein as being performed by a network node. Any information, data and/or signals may be received from a wireless device, another network node and/or any other network equipment. Similarly, antenna 362, interface 390, and/or processing circuitry 370 may be configured to perform any transmitting operations described herein as being performed by a network node. Any information, data and/or signals may be transmitted to a wireless device, another network node and/or any other network equipment.

Power circuitry 387 may comprise, or be coupled to, power management circuitry and is configured to supply the components of network node 360 with power for performing the functionality described herein. Power circuitry 387 may receive power from power source 386. Power source 386 and/or power circuitry 387 may be configured to provide power to the various components of network node 360 in a form suitable for the respective components (e.g., at a voltage and current level needed for each respective component). Power source 386 may either be included in, or external to, power circuitry 387 and/or network node 360. For example, network node 360 may be connectable to an external power source (e.g., an electricity outlet) via an input circuitry or interface such as an electrical cable, whereby the external power source supplies power to power circuitry 387. As a further example, power source 386 may comprise a source of power in the form of a battery or battery pack which is connected to, or integrated in, power circuitry 387. The battery may provide backup power should the external power source fail. Other types of power sources, such as photovoltaic devices, may also be used.

Alternative embodiments of network node 360 may include additional components beyond those shown in FIG. 3 that may be responsible for providing certain aspects of the network node's functionality, including any of the functionality described herein and/or any functionality necessary to support the subject matter described herein. For example, network node 360 may include user interface equipment to allow input of information into network node 360 and to allow output of information from network node 360. This may allow a user to perform diagnostic, maintenance, repair, and other administrative functions for network node 360.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 310 includes antenna 311, interface 314, processing circuitry 320, device readable medium 330, user interface equipment 332, auxiliary equipment 334, power source 336 and power circuitry 337. WD 310 may include multiple sets of one or more of the illustrated components for different wireless technologies supported by WD 310, such as, for example, GSM, WCDMA, LTE, NR, WiFi, WiMAX, or Bluetooth wireless technologies, just to mention a few. These wireless technologies may be integrated into the same or different chips or set of chips as other components within WD 310.

Antenna 311 may include one or more antennas or antenna arrays, configured to send and/or receive wireless signals, and is connected to interface 314. In certain alternative embodiments, antenna 311 may be separate from WD 310 and be connectable to WD 310 through an interface or port. Antenna 311, interface 314, and/or processing circuitry 320 may be configured to perform any receiving or transmitting operations described herein as being performed by a WD. Any information, data and/or signals may be received from a network node and/or another WD. In some embodiments, radio front end circuitry and/or antenna 311 may be considered an interface.

As illustrated, interface 314 comprises radio front end circuitry 312 and antenna 311. Radio front end circuitry 312 comprise one or more filters 318 and amplifiers 316. Radio front end circuitry 314 is connected to antenna 311 and processing circuitry 320, and is configured to condition signals communicated between antenna 311 and processing circuitry 320. Radio front end circuitry 312 may be coupled to or a part of antenna 311. In some embodiments, WD 310 may not include separate radio front end circuitry 312; rather, processing circuitry 320 may comprise radio front end circuitry and may be connected to antenna 311. Similarly, in some embodiments, some or all of RF transceiver circuitry 322 may be considered a part of interface 314. Radio front end circuitry 312 may receive digital data that is to be sent out to other network nodes or WDs via a wireless connection. Radio front end circuitry 312 may convert the digital data into a radio signal having the appropriate channel and bandwidth parameters using a combination of filters 318 and/or amplifiers 316. The radio signal may then be transmitted via antenna 311. Similarly, when receiving data, antenna 311 may collect radio signals which are then converted into digital data by radio front end circuitry 312. The digital data may be passed to processing circuitry 320. In other embodiments, the interface may comprise different components and/or different combinations of components.

Processing circuitry 320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 310 components, such as device readable medium 330, WD 310 functionality. Such functionality may include providing any of the various wireless features or benefits discussed herein. For example, processing circuitry 320 may execute instructions stored in device readable medium 330 or in memory within processing circuitry 320 to provide the functionality disclosed herein.

As illustrated, processing circuitry 320 includes one or more of RF transceiver circuitry 322, baseband processing circuitry 324, and application processing circuitry 326. In other embodiments, the processing circuitry may comprise different components and/or different combinations of components. In certain embodiments processing circuitry 320 of WD 310 may comprise a SOC. In some embodiments, RF transceiver circuitry 322, baseband processing circuitry 324, and application processing circuitry 326 may be on separate chips or sets of chips. In alternative embodiments, part or all of baseband processing circuitry 324 and application processing circuitry 326 may be combined into one chip or set of chips, and RF transceiver circuitry 322 may be on a separate chip or set of chips. In still alternative embodiments, part or all of RF transceiver circuitry 322 and baseband processing circuitry 324 may be on the same chip or set of chips, and application processing circuitry 326 may be on a separate chip or set of chips. In yet other alternative embodiments, part or all of RF transceiver circuitry 322, baseband processing circuitry 324, and application processing circuitry 326 may be combined in the same chip or set of chips. In some embodiments, RF transceiver circuitry 322 may be a part of interface 314. RF transceiver circuitry 322 may condition RF signals for processing circuitry 320.

In certain embodiments, some or all of the functionality described herein as being performed by a WD may be provided by processing circuitry 320 executing instructions stored on device readable medium 330, which in certain embodiments may be a computer-readable storage medium. In alternative embodiments, some or all of the functionality may be provided by processing circuitry 320 without executing instructions stored on a separate or discrete device readable storage medium, such as in a hard-wired manner. In any of those particular embodiments, whether executing instructions stored on a device readable storage medium or not, processing circuitry 320 can be configured to perform the described functionality. The benefits provided by such functionality are not limited to processing circuitry 320 alone or to other components of WD 310, but are enjoyed by WD 310 as a whole, and/or by end users and the wireless network generally.

Processing circuitry 320 may be configured to perform any determining, calculating, or similar operations (e.g., certain obtaining operations) described herein as being performed by a WD. These operations, as performed by processing circuitry 320, may include processing information obtained by processing circuitry 320 by, for example, converting the obtained information into other information, comparing the obtained information or converted information to information stored by WD 310, and/or performing one or more operations based on the obtained information or converted information, and as a result of said processing making a determination.

Device readable medium 330 may be operable to store a computer program, software, an application including one or more of logic, rules, code, tables, etc. and/or other instructions capable of being executed by processing circuitry 320. Device readable medium 330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 320. In some embodiments, processing circuitry 320 and device readable medium 330 may be considered to be integrated.

User interface equipment 332 may provide components that allow for a human user to interact with WD 310. Such interaction may be of many forms, such as visual, audial, tactile, etc. User interface equipment 332 may be operable to produce output to the user and to allow the user to provide input to WD 310. The type of interaction may vary depending on the type of user interface equipment 332 installed in WD 310. For example, if WD 310 is a smart phone, the interaction may be via a touch screen; if WD 310 is a smart meter, the interaction may be through a screen that provides usage (e.g., the number of gallons used) or a speaker that provides an audible alert (e.g., if smoke is detected). User interface equipment 332 may include input interfaces, devices and circuits, and output interfaces, devices and circuits. User interface equipment 332 is configured to allow input of information into WD 310, and is connected to processing circuitry 320 to allow processing circuitry 320 to process the input information. User interface equipment 332 may include, for example, a microphone, a proximity or other sensor, keys/buttons, a touch display, one or more cameras, a USB port, or other input circuitry. User interface equipment 332 is also configured to allow output of information from WD 310, and to allow processing circuitry 320 to output information from WD 310. User interface equipment 332 may include, for example, a speaker, a display, vibrating circuitry, a USB port, a headphone interface, or other output circuitry. Using one or more input and output interfaces, devices, and circuits, of user interface equipment 332, WD 310 may communicate with end users and/or the wireless network, and allow them to benefit from the functionality described herein.

Auxiliary equipment 334 is operable to provide more specific functionality which may not be generally performed by WDs. This may comprise specialized sensors for doing measurements for various purposes, interfaces for additional types of communication such as wired communications etc. The inclusion and type of components of auxiliary equipment 334 may vary depending on the embodiment and/or scenario.

Power source 336 may, in some embodiments, be in the form of a battery or battery pack. Other types of power sources, such as an external power source (e.g., an electricity outlet), photovoltaic devices or power cells, may also be used. WD 310 may further comprise power circuitry 337 for delivering power from power source 336 to the various parts of WD 310 which need power from power source 336 to carry out any functionality described or indicated herein. Power circuitry 337 may in certain embodiments comprise power management circuitry. Power circuitry 337 may additionally or alternatively be operable to receive power from an external power source; in which case WD 310 may be connectable to the external power source (such as an electricity outlet) via input circuitry or an interface such as an electrical power cable. Power circuitry 337 may also in certain embodiments be operable to deliver power from an external power source to power source 336. This may be, for example, for the charging of power source 336. Power circuitry 337 may perform any formatting, converting, or other modification to the power from power source 336 to make the power suitable for the respective components of WD 310 to which power is supplied.

Figure 4:
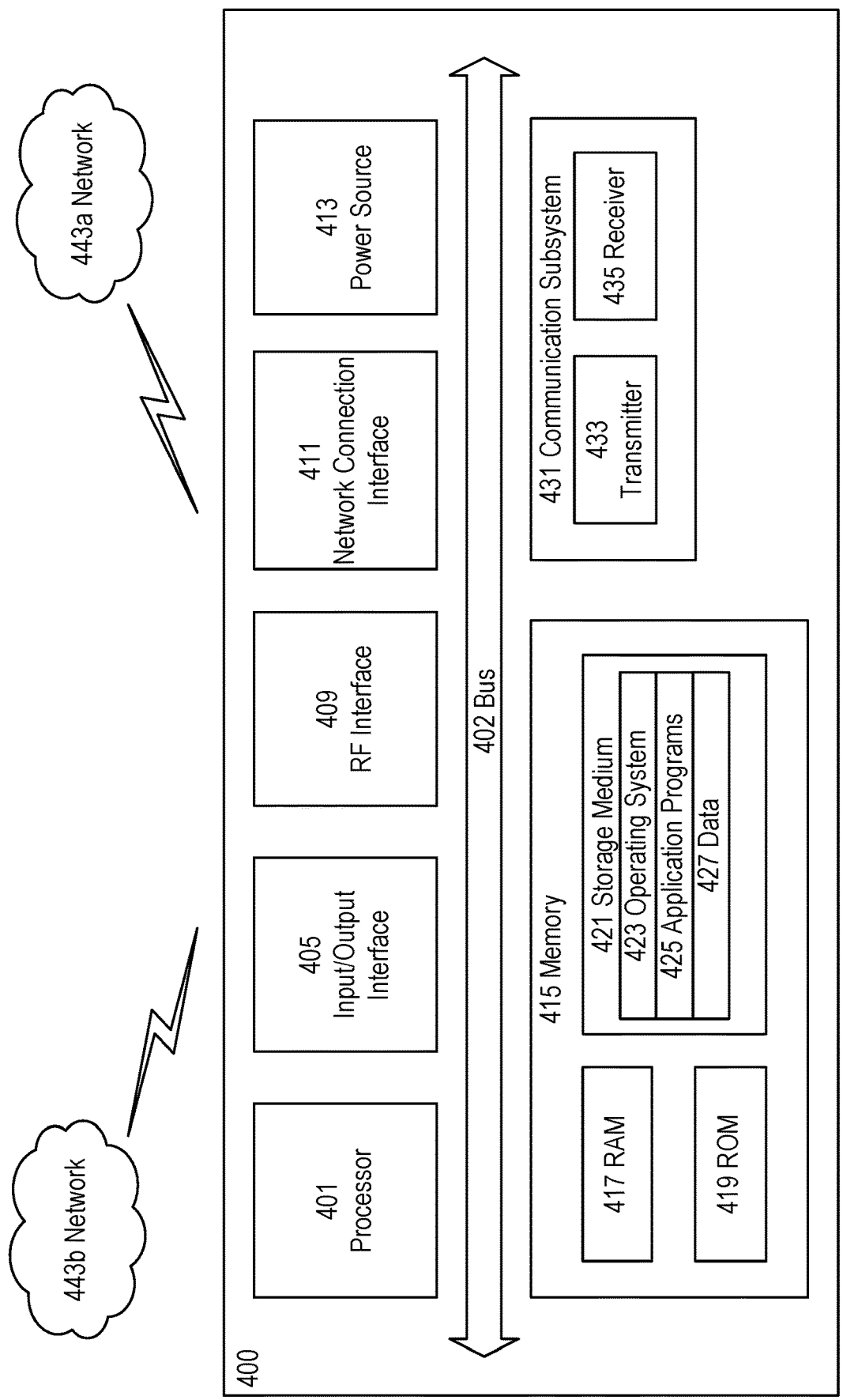
FIG. 4 illustrates a User Equipment in accordance with some embodiments.

FIG. 4 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 400 may be any UE identified by the $3^{rd}$ Generation Partnership Project (3GPP), including a NB-IoT UE, a machine type communication (MTC) UE, and/or an enhanced MTC (eMTC) UE. UE 400, as illustrated in FIG. 4, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 4 is a UE, the components discussed herein are equally applicable to a WD, and vice-versa.

In FIG. 4, UE 400 includes processing circuitry 401 that is operatively coupled to input/output interface 405, radio frequency (RF) interface 409, network connection interface 411, memory 415 including random access memory (RAM) 417, read-only memory (ROM) 419, and storage medium 421 or the like, communication subsystem 431, power source 433, and/or any other component, or any combination thereof. Storage medium 421 includes operating system 423, application program 425, and data 427. In other embodiments, storage medium 421 may include other similar types of information. Certain UEs may utilize all of the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry 401 may be configured to process computer instructions and data. Processing circuitry 401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 401 may include two central processing units (CPUs). Data may be information in a form suitable for use by a computer.

In the depicted embodiment, input/output interface 405 may be configured to provide a communication interface to an input device, output device, or input and output device. UE 400 may be configured to use an output device via input/output interface 405. An output device may use the same type of interface port as an input device. For example, a USB port may be used to provide input to and output from UE 400. The output device may be a speaker, a sound card, a video card, a display, a monitor, a printer, an actuator, an emitter, a smartcard, another output device, or any combination thereof. UE 400 may be configured to use an input device via input/output interface 405 to allow a user to capture information into UE 400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 409 may be configured to provide a communication interface to RF components such as a transmitter, a receiver, and an antenna. Network connection interface 411 may be configured to provide a communication interface to network 443*a*. Network 443*a* may encompass wired and/or wireless networks such as a local-area network (LAN), a wide-area network (WAN), a computer network, a wireless network, a telecommunications network, another like network or any combination thereof. For example, network 443*a* may comprise a Wi-Fi network. Network connection interface 411 may be configured to include a receiver and a transmitter interface used to communicate with one or more other devices over a communication network according to one or more communication protocols, such as Ethernet, TCP/IP, SONET, ATM, or the like. Network connection interface 411 may implement receiver and transmitter functionality appropriate to the communication network links (e.g., optical, electrical, and the like). The transmitter and receiver functions may share circuit components, software or firmware, or alternatively may be implemented separately.

RAM 417 may be configured to interface via bus 402 to processing circuitry 401 to provide storage or caching of data or computer instructions during the execution of software programs such as the operating system, application programs, and device drivers. ROM 419 may be configured to provide computer instructions or data to processing circuitry 401. For example, ROM 419 may be configured to store invariant low-level system code or data for basic system functions such as basic input and output (I/O), startup, or reception of keystrokes from a keyboard that are stored in a non-volatile memory. Storage medium 421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 421 may be configured to include operating system 423, application program 425 such as a web browser application, a widget or gadget engine or another application, and data file 427. Storage medium 421 may store, for use by UE 400, any of a variety of various operating systems or combinations of operating systems.

Storage medium 421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 421 may allow UE 400 to access computer-executable instructions, application programs or the like, stored on transitory or non-transitory memory media, to off-load data, or to upload data. An article of manufacture, such as one utilizing a communication system may be tangibly embodied in storage medium 421, which may comprise a device readable medium.

In FIG. 4, processing circuitry 401 may be configured to communicate with network 443*b* using communication subsystem 431. Network 443*a* and network 443*b* may be the same network or networks or different network or networks. Communication subsystem 431 may be configured to include one or more transceivers used to communicate with network 443*b*. For example, communication subsystem 431 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 433 and/or receiver 435 to implement transmitter or receiver functionality, respectively, appropriate to the RAN links (e.g., frequency allocations and the like). Further, transmitter 433 and receiver 435 of each transceiver may share circuit components, software or firmware, or alternatively may be implemented separately.

In the illustrated embodiment, the communication functions of communication subsystem 431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 431 may include cellular communication, Wi-Fi communication, Bluetooth communication, and GPS communication. Network 443*b* may encompass wired and/or wireless networks such as a local-area network (LAN), a wide-area network (WAN), a computer network, a wireless network, a telecommunications network, another like network or any combination thereof. For example, network 443*b* may be a cellular network, a Wi-Fi network, and/or a near-field network. Power source 413 may be configured to provide alternating current (AC) or direct current (DC) power to components of UE 400.

The features, benefits and/or functions described herein may be implemented in one of the components of UE 400 or partitioned across multiple components of UE 400. Further, the features, benefits, and/or functions described herein may be implemented in any combination of hardware, software or firmware. In one example, communication subsystem 431 may be configured to include any of the components described herein. Further, processing circuitry 401 may be configured to communicate with any of such components over bus 402. In another example, any of such components may be represented by program instructions stored in memory that when executed by processing circuitry 401 perform the corresponding functions described herein. In another example, the functionality of any of such components may be partitioned between processing circuitry 401 and communication subsystem 431. In another example, the non-computationally intensive functions of any of such components may be implemented in software or firmware and the computationally intensive functions may be implemented in hardware.

Figure 5:
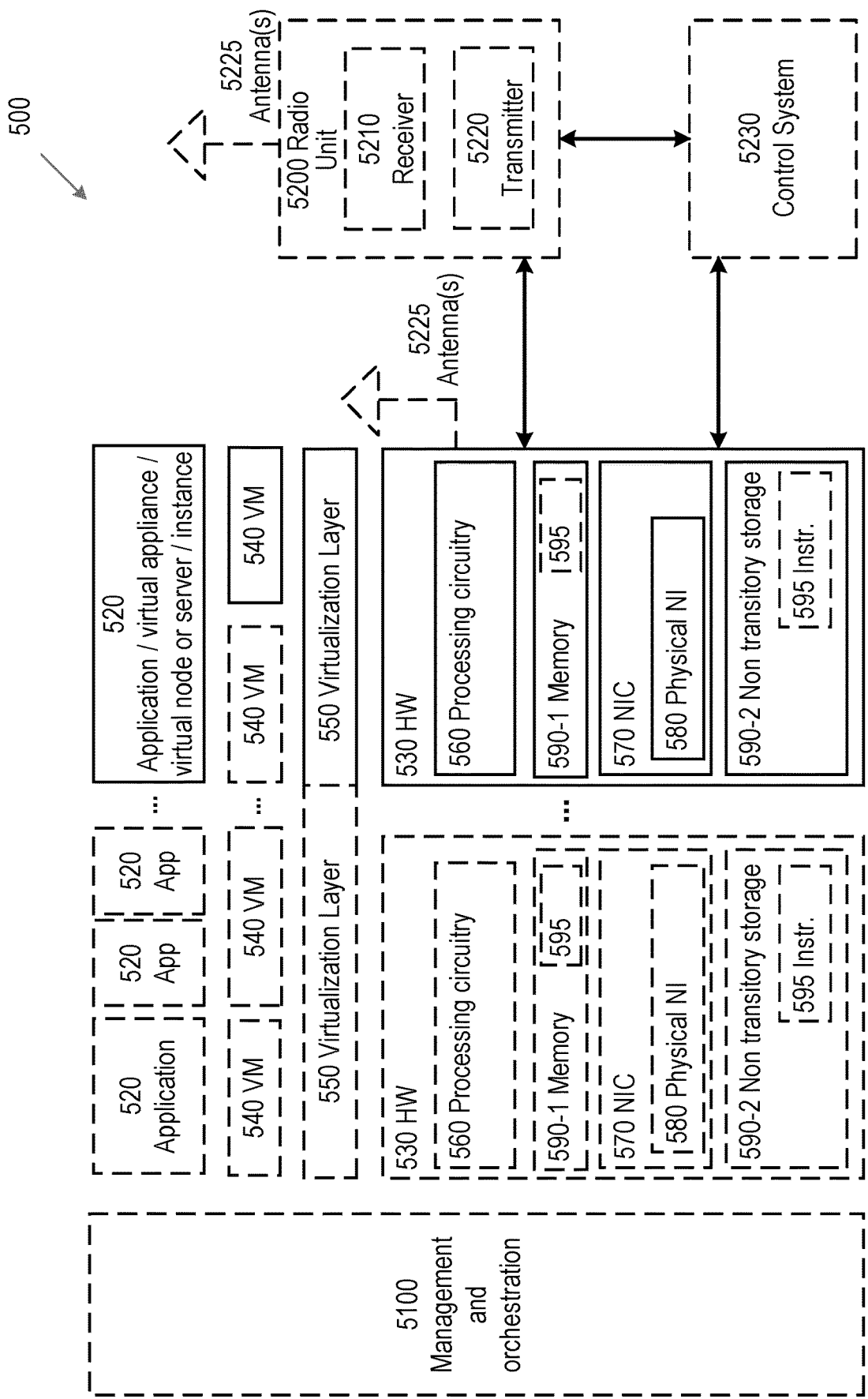
FIG. 5 shows a virtualization environment in accordance with some embodiments.

FIG. 5 is a schematic block diagram illustrating a virtualization environment 500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 500 hosted by one or more of hardware nodes 530. Further, in embodiments in which the virtual node is not a radio access node or does not require radio connectivity (e.g., a core network node), then the network node may be entirely virtualized.

The functions may be implemented by one or more applications 520 (which may alternatively be called software instances, virtual appliances, network functions, virtual nodes, virtual network functions, etc.) operative to implement some of the features, functions, and/or benefits of some of the embodiments disclosed herein. Applications 520 are run in virtualization environment 500 which provides hardware 530 comprising processing circuitry 560 and memory 590. Memory 590 contains instructions 595 executable by processing circuitry 560 whereby application 520 is operative to provide one or more of the features, benefits, and/or functions disclosed herein.

Virtualization environment 500, comprises general-purpose or special-purpose network hardware devices 530 comprising a set of one or more processors or processing circuitry 560, which may be commercial off-the-shelf (COTS) processors, dedicated Application Specific Integrated Circuits (ASICs), or any other type of processing circuitry including digital or analog hardware components or special purpose processors. Each hardware device may comprise memory 590-1 which may be non-persistent memory for temporarily storing instructions 595 or software executed by processing circuitry 560. Each hardware device may comprise one or more network interface controllers (NICs) 570, also known as network interface cards, which include physical network interface 580. Each hardware device may also include non-transitory, persistent, machine-readable storage media 590-2 having stored therein software 595 and/or instructions executable by processing circuitry 560. Software 595 may include any type of software including software for instantiating one or more virtualization layers 550 (also referred to as hypervisors), software to execute virtual machines 540 as well as software allowing it to execute functions, features and/or benefits described in relation with some embodiments described herein.

Virtual machines 540, comprise virtual processing, virtual memory, virtual networking or interface and virtual storage, and may be run by a corresponding virtualization layer 550 or hypervisor. Different embodiments of the instance of virtual appliance 520 may be implemented on one or more of virtual machines 540, and the implementations may be made in different ways.

During operation, processing circuitry 560 executes software 595 to instantiate the hypervisor or virtualization layer 550, which may sometimes be referred to as a virtual machine monitor (VMM). Virtualization layer 550 may present a virtual operating platform that appears like networking hardware to virtual machine 540.

As shown in FIG. 5, hardware 530 may be a standalone network node with generic or specific components. Hardware 530 may comprise antenna 5225 and may implement some functions via virtualization. Alternatively, hardware 530 may be part of a larger cluster of hardware (e.g. such as in a data center or customer premise equipment (CPE)) where many hardware nodes work together and are managed via management and orchestration (MANO) 5100, which, among others, oversees lifecycle management of applications 520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 540 may be a software implementation of a physical machine that runs programs as if they were executing on a physical, non-virtualized machine. Each of virtual machines 540, and that part of hardware 530 that executes that virtual machine, be it hardware dedicated to that virtual machine and/or hardware shared by that virtual machine with others of the virtual machines 540, forms a separate virtual network elements (VNE).

Still in the context of NFV, Virtual Network Function (VNF) is responsible for handling specific network functions that run in one or more virtual machines 540 on top of hardware networking infrastructure 530 and corresponds to application 520 in FIG. 5.

In some embodiments, one or more radio units 5200 that each include one or more transmitters 5220 and one or more receivers 5210 may be coupled to one or more antennas 5225. Radio units 5200 may communicate directly with hardware nodes 530 via one or more appropriate network interfaces and may be used in combination with the virtual components to provide a virtual node with radio capabilities, such as a radio access node or a base station.

In some embodiments, some signalling can be effected with the use of control system 5230 which may alternatively be used for communication between the hardware nodes 530 and radio units 5200.

Figure 6:
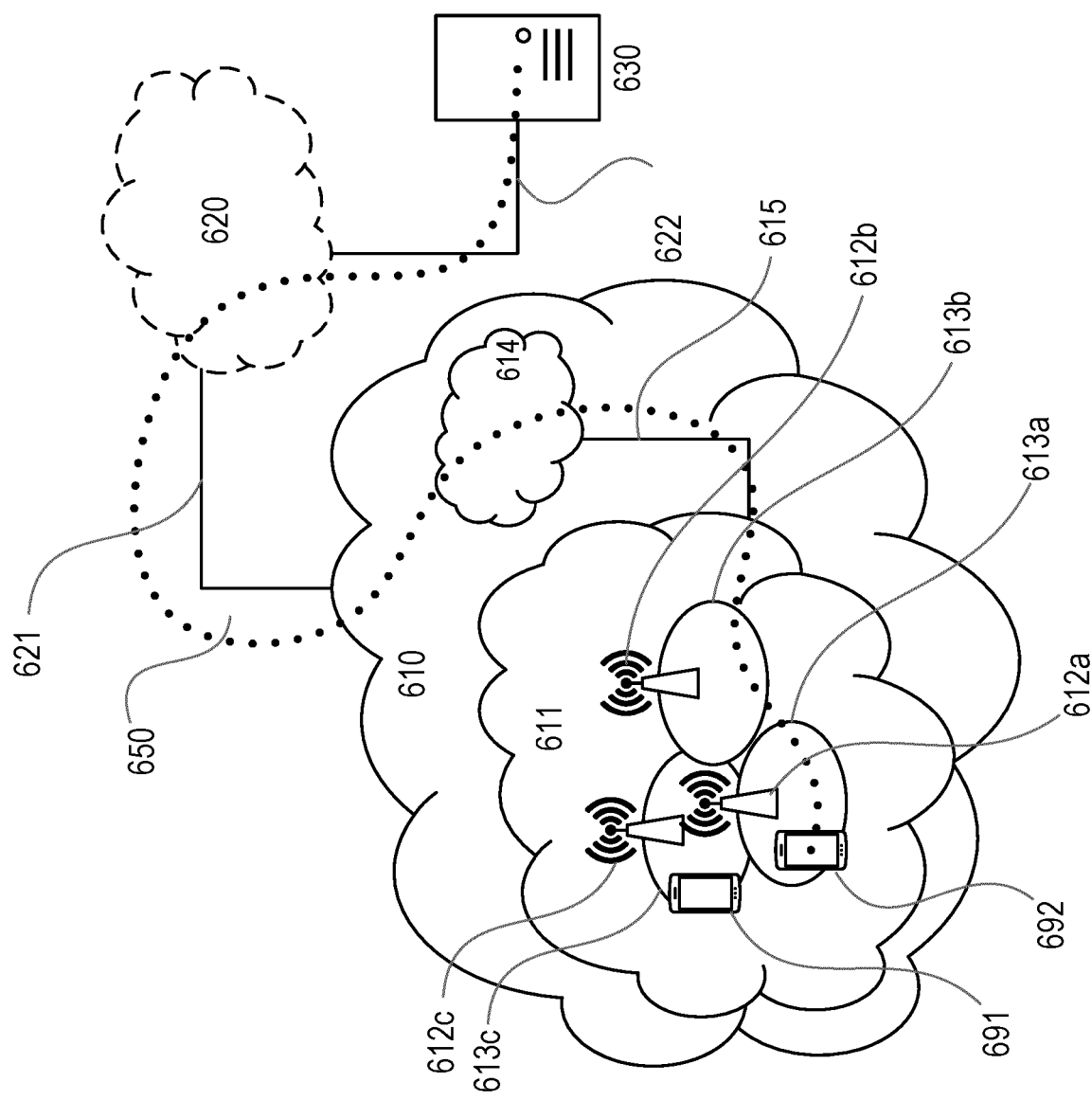
FIG. 6 shows a telecommunication network connected via an intermediate network to a host computer in accordance with some embodiments.

FIG. 6 shows a telecommunication network connected via an intermediate network to a host computer in accordance with some embodiments. With reference to FIG. 6, in accordance with an embodiment, a communication system includes telecommunication network 610, such as a 3GPP-type cellular network, which comprises access network 611, such as a radio access network, and core network 614. Access network 611 comprises a plurality of base stations 612a, 612b, 612c, such as NBs, eNBs, gNBs or other types of wireless access points, each defining a corresponding coverage area 613a, 613b, 613c. Each base station 612a, 612b, 612c is connectable to core network 614 over a wired or wireless connection 615. A first UE 691 located in coverage area 613c is configured to wirelessly connect to, or be paged by, the corresponding base station 612c. A second UE 692 in coverage area 613a is wirelessly connectable to the corresponding base station 612a. While a plurality of UEs 691, 692 are illustrated in this example, the disclosed embodiments are equally applicable to a situation where a sole UE is in the coverage area or where a sole UE is connecting to the corresponding base station 612.

Telecommunication network 610 is itself connected to host computer 630, which may be embodied in the hardware and/or software of a standalone server, a cloud-implemented server, a distributed server or as processing resources in a server farm. Host computer 630 may be under the ownership or control of a service provider, or may be operated by the service provider or on behalf of the service provider. Connections 621 and 622 between telecommunication network 610 and host computer 630 may extend directly from core network 614 to host computer 630 or may go via an optional intermediate network 620. Intermediate network 620 may be one of, or a combination of more than one of, a public, private or hosted network; intermediate network 620, if any, may be a backbone network or the Internet; in particular, intermediate network 620 may comprise two or more sub-networks (not shown).

The communication system of FIG. 6 as a whole enables connectivity between the connected UEs 691, 692 and host computer 630. The connectivity may be described as an over-the-top (OTT) connection 650. Host computer 630 and the connected UEs 691, 692 are configured to communicate data and/or signaling via OTT connection 650, using access network 611, core network 614, any intermediate network 620 and possible further infrastructure (not shown) as intermediaries. OTT connection 650 may be transparent in the sense that the participating communication devices through which OTT connection 650 passes are unaware of routing of uplink and downlink communications. For example, base station 612 may not or need not be informed about the past routing of an incoming downlink communication with data originating from host computer 630 to be forwarded (e.g., handed over) to a connected UE 691. Similarly, base station 612 need not be aware of the future routing of an outgoing uplink communication originating from the UE 691 towards the host computer 630.

Example implementations, in accordance with an embodiment, of the UE, base station and host computer discussed in the preceding paragraphs will now be described with reference to FIG. 7. In communication system 700, host computer 710 comprises hardware 715 including communication interface 716 configured to set up and maintain a wired or wireless connection with an interface of a different communication device of communication system 700. Host computer 710 further comprises processing circuitry 718, which may have storage and/or processing capabilities. In particular, processing circuitry 718 may comprise one or more programmable processors, application-specific integrated circuits, field programmable gate arrays or combinations of these (not shown) adapted to execute instructions. Host computer 710 further comprises software 711, which is stored in or accessible by host computer 710 and executable by processing circuitry 718. Software 711 includes host application 712. Host application 712 may be operable to provide a service to a remote user, such as UE 730 connecting via OTT connection 750 terminating at UE 730 and host computer 710. In providing the service to the remote user, host application 712 may provide user data which is transmitted using OTT connection 750.

Communication system 700 further includes base station 720 provided in a telecommunication system and comprising hardware 725 enabling it to communicate with host computer 710 and with UE 730. Hardware 725 may include communication interface 726 for setting up and maintaining a wired or wireless connection with an interface of a different communication device of communication system 700, as well as radio interface 727 for setting up and maintaining at least wireless connection 770 with UE 730 located in a coverage area (not shown in FIG. 7) served by base station 720. Communication interface 726 may be configured to facilitate connection 760 to host computer 710. Connection 760 may be direct or it may pass through a core network (not shown in FIG. 7) of the telecommunication system and/or through one or more intermediate networks outside the telecommunication system. In the embodiment shown, hardware 725 of base station 720 further includes processing circuitry 728, which may comprise one or more programmable processors, application-specific integrated circuits, field programmable gate arrays or combinations of these (not shown) adapted to execute instructions. Base station 720 further has software 721 stored internally or accessible via an external connection.

Communication system 700 further includes UE 730 already referred to. Its hardware 735 may include radio interface 737 configured to set up and maintain wireless connection 770 with a base station serving a coverage area in which UE 730 is currently located. Hardware 735 of UE 730 further includes processing circuitry 738, which may comprise one or more programmable processors, application-specific integrated circuits, field programmable gate arrays or combinations of these (not shown) adapted to execute instructions. UE 730 further comprises software 731, which is stored in or accessible by UE 730 and executable by processing circuitry 738. Software 731 includes client application 732. Client application 732 may be operable to provide a service to a human or non-human user via UE 730, with the support of host computer 710. In host computer 710, an executing host application 712 may communicate with the executing client application 732 via OTT connection 750 terminating at UE 730 and host computer 710. In providing the service to the user, client application 732 may receive request data from host application 712 and provide user data in response to the request data. OTT connection 750 may transfer both the request data and the user data. Client application 732 may interact with the user to generate the user data that it provides.

Figure 7:
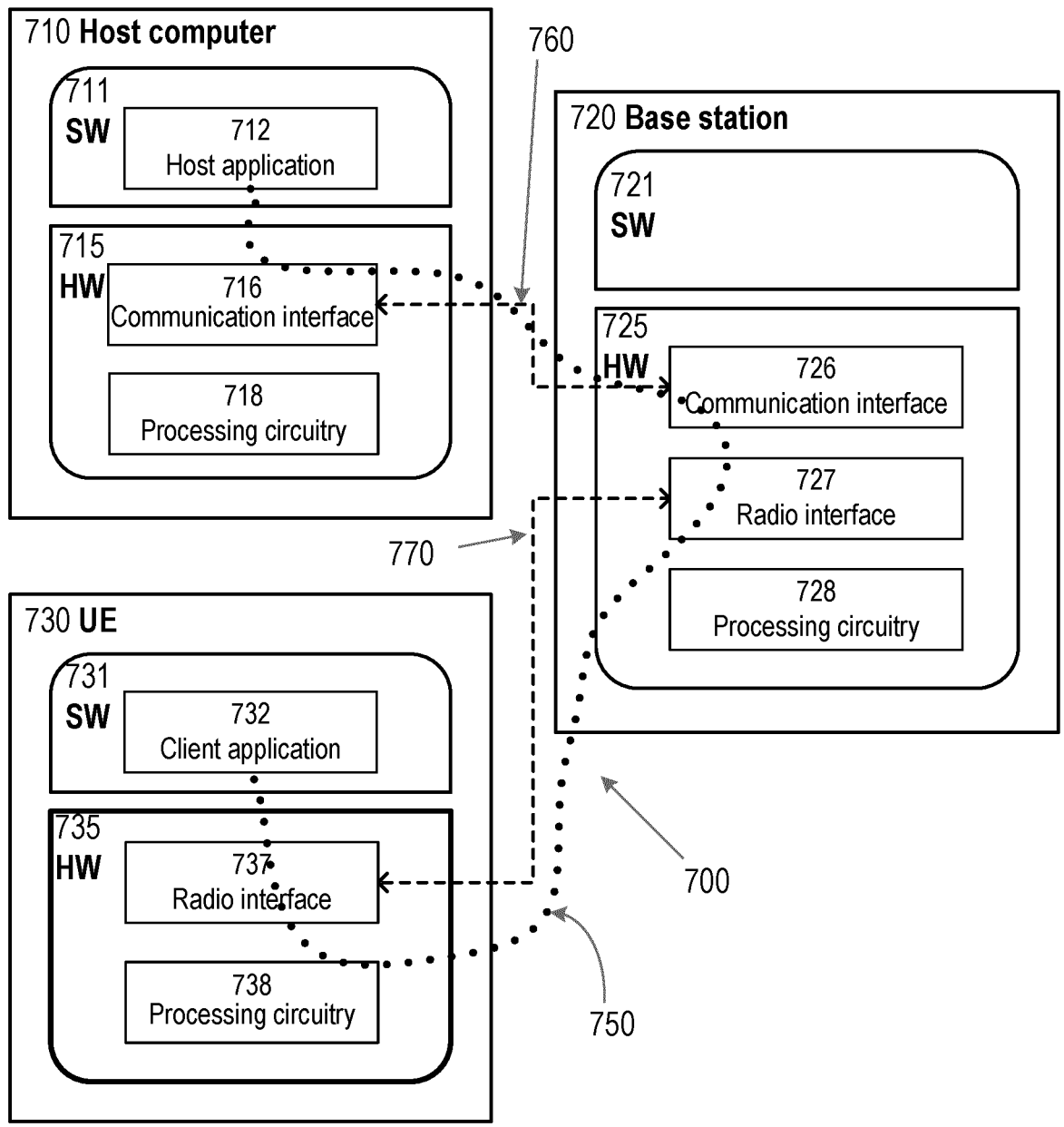
FIG. 7 shows a host computer communicating via a base station with a user equipment over a partially wireless connection in accordance with some embodiments.

It is noted that host computer 710, base station 720 and UE 730 illustrated in FIG. 7 may be similar or identical to host computer 630, one of base stations 612*a*, 612*b*, 612*c* and one of UEs 691, 692 of FIG. 6, respectively. This is to say, the inner workings of these entities may be as shown in FIG. 7 and independently, the surrounding network topology may be that of FIG. 6.

In FIG. 7, OTT connection 750 has been drawn abstractly to illustrate the communication between host computer 710 and UE 730 via base station 720, without explicit reference to any intermediary devices and the precise routing of messages via these devices. Network infrastructure may determine the routing, which it may be configured to hide from UE 730 or from the service provider operating host computer 710, or both. While OTT connection 750 is active, the network infrastructure may further take decisions by which it dynamically changes the routing (e.g., on the basis of load balancing consideration or reconfiguration of the network).

Wireless connection 770 between UE 730 and base station 720 is in accordance with the teachings of the embodiments described throughout this disclosure. One or more of the various embodiments improve the performance of OTT services provided to UE 730 using OTT connection 750, in which wireless connection 770 forms the last segment. More precisely, the teachings of these embodiments may improve the power consumption of the wireless device and thereby provide benefits such as extended battery lifetime of the wireless device.

A measurement procedure may be provided for the purpose of monitoring data rate, latency and other factors on which the one or more embodiments improve. There may further be an optional network functionality for reconfiguring OTT connection 750 between host computer 710 and UE 730, in response to variations in the measurement results. The measurement procedure and/or the network functionality for reconfiguring OTT connection 750 may be implemented in software 711 and hardware 715 of host computer 710 or in software 731 and hardware 735 of UE 730, or both. In embodiments, sensors (not shown) may be deployed in or in association with communication devices through which OTT connection 750 passes; the sensors may participate in the measurement procedure by supplying values of the monitored quantities exemplified above, or supplying values of other physical quantities from which software 711, 731 may compute or estimate the monitored quantities. The reconfiguring of OTT connection 750 may include message format, retransmission settings, preferred routing etc.; the reconfiguring need not affect base station 720, and it may be unknown or imperceptible to base station 720. Such procedures and functionalities may be known and practiced in the art. In certain embodiments, measurements may involve proprietary UE signaling facilitating host computer 710's measurements of throughput, propagation times, latency and the like. The measurements may be implemented in that software 711 and 731 causes messages to be transmitted, in particular empty or 'dummy' messages, using OTT connection 750 while it monitors propagation times, errors etc.

Figure 8:
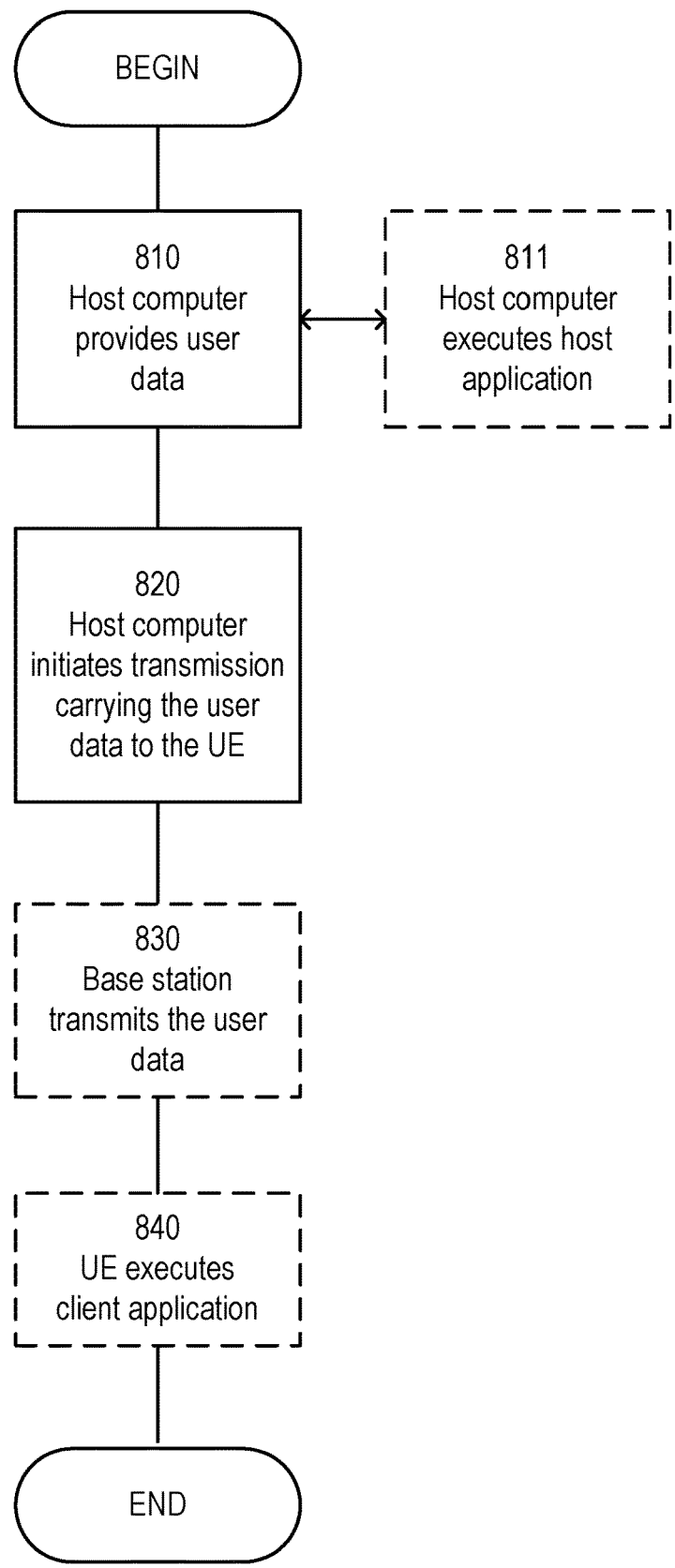
FIG. 8 illustrates methods implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In step 810, the host computer provides user data. In substep 811 (which may be optional) of step 810, the host computer provides the user data by executing a host application. In step 820, the host computer initiates a transmission carrying the user data to the UE. In step 830 (which may be optional), the base station transmits to the UE the user data which was carried in the transmission that the host computer initiated, in accordance with the teachings of the embodiments described throughout this disclosure. In step 840 (which may also be optional), the UE executes a client application associated with the host application executed by the host computer.

Figure 9:
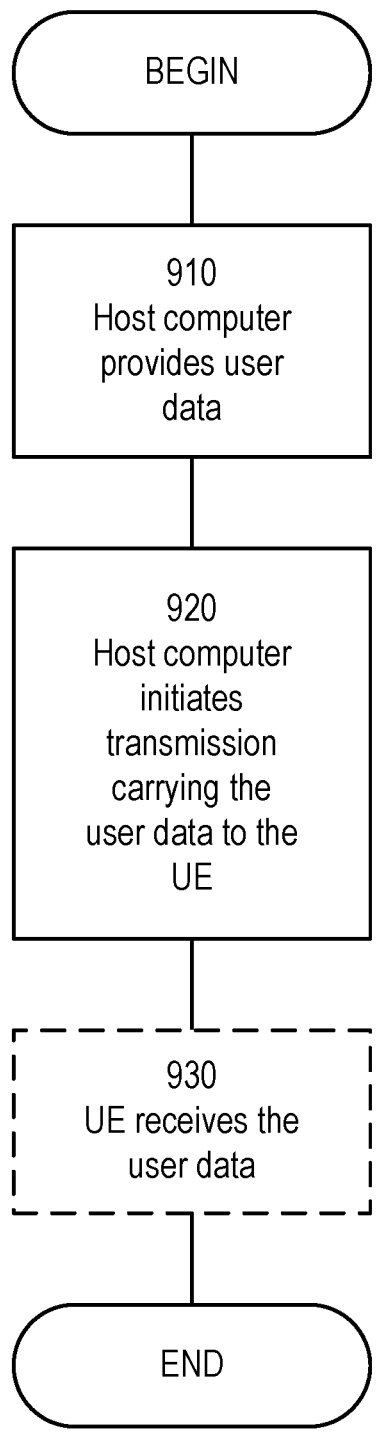
FIG. 9 illustrates methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In step 910 of the method, the host computer provides user data. In an optional substep (not shown) the host computer provides the user data by executing a host application. In step 920, the host computer initiates a transmission carrying the user data to the UE. The transmission may pass via the base station, in accordance with the teachings of the embodiments described throughout this disclosure. In step 930 (which may be optional), the UE receives the user data carried in the transmission.

Figure 10:
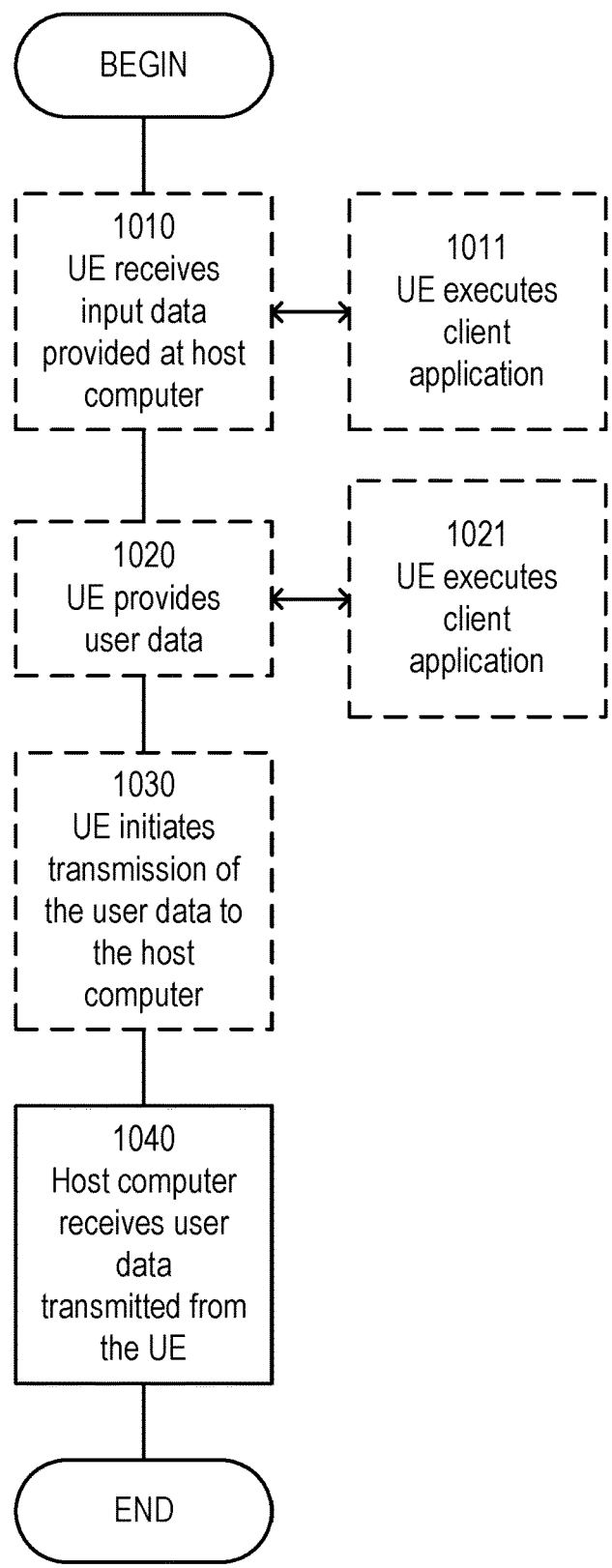
FIG. 10 illustrates methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 1010 will be included in this section. In step 1010 (which may be optional), the UE receives input data provided by the host computer. Additionally or alternatively, in step 1020, the UE provides user data. In substep 1021 (which may be optional) of step 1020, the UE provides the user data by executing a client application. In substep 1011 (which may be optional) of step 1010, the UE executes a client application which provides the user data in reaction to the received input data provided by the host computer. In providing the user data, the executed client application may further consider user input received from the user. Regardless of the specific manner in which the user data was provided, the UE initiates, in substep 1030 (which may be optional), transmission of the user data to the host computer. In step 1040 of the method, the host computer receives the user data transmitted from the UE, in accordance with the teachings of the embodiments described throughout this disclosure.

Figure 11:
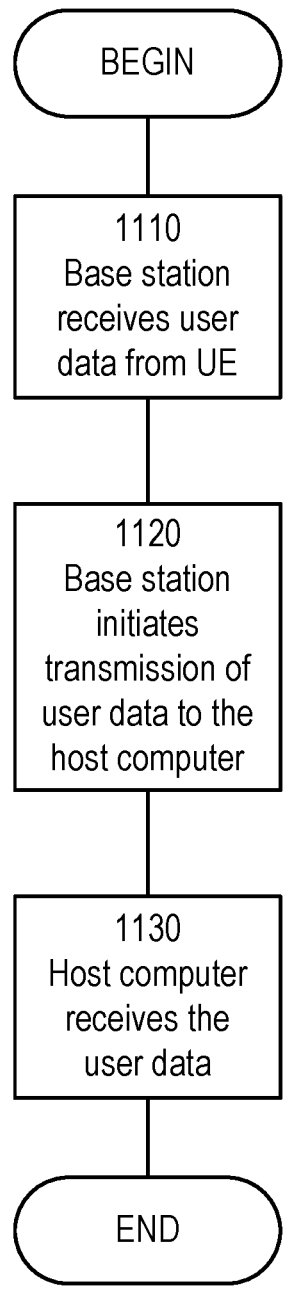
FIG. 11 illustrates methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In step 1110 (which may be optional), in accordance with the teachings of the embodiments described throughout this disclosure, the base station receives user data from the UE. In step 1120 (which may be optional), the base station initiates transmission of the received user data to the host computer. In step 1130 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 12:
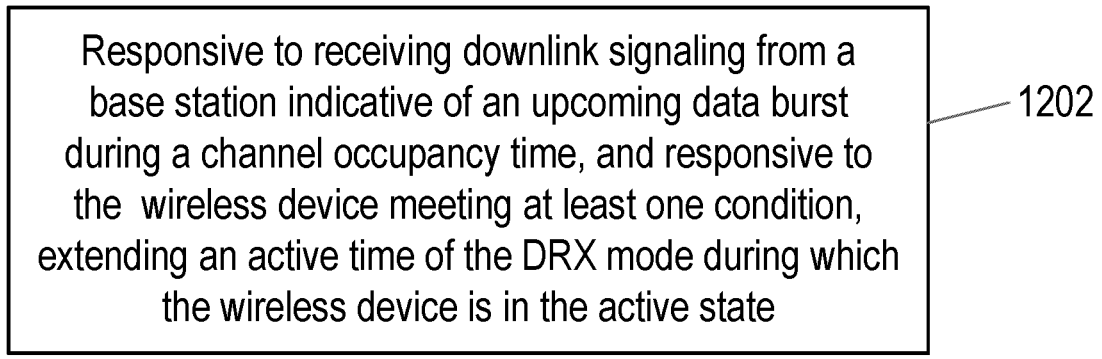
FIG. 12 illustrates a method in accordance with some embodiments.

FIG. 12 depicts a method in accordance with particular embodiments, wherein the method is performed by a wireless device operating in a discontinuous reception, DRX, mode having an active state and a sleep state. The method begins at step 1202 with responsive to receiving downlink signaling from a base station indicative of an upcoming data burst during a channel occupancy time, and responsive to the wireless device meeting at least one condition, extending an active time of the DRX mode during which the wireless device is in the active state.

Figure 13:
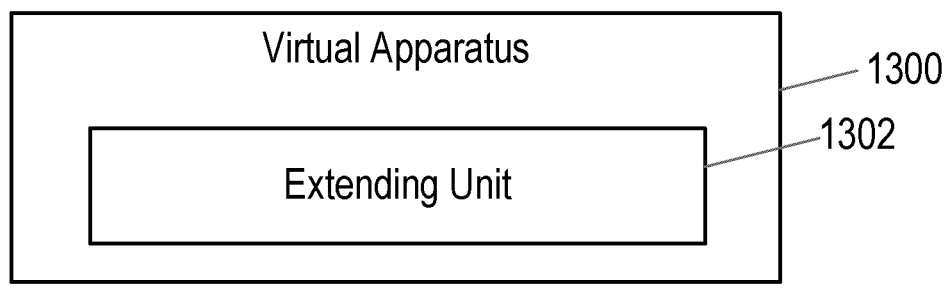
FIG. 13 illustrates a virtualization apparatus in accordance with some embodiments.

FIG. 13 illustrates a schematic block diagram of an apparatus 1300 in a wireless network (for example, the wireless network shown in FIG. 3). The apparatus may be implemented in a wireless device or network node (e.g., wireless device 310 or network node 360 shown in FIG. 3). Apparatus 1300 is operable to carry out the example method described with reference to FIG. 12 and possibly any other processes or methods disclosed herein. It is also to be understood that the method of FIG. 12 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Extending unit 1302, and any other suitable units of apparatus 1300 to perform corresponding functions according one or more embodiments of the present disclosure.

As illustrated in FIG. 13, apparatus 1300 includes Extending unit 1302. The Extending Unit 1302 is configured to responsive to receiving downlink signaling from a base station indicative of an upcoming data burst during a channel occupancy time, and responsive to the wireless device meeting at least one condition, extend an active time of the DRX mode during which the wireless device is in the active state.

FIG. 14 depicts a method in accordance with particular embodiments, wherein the method is performed by a base station. The method begins at step 1402 with the base station transmitting, or causing to transmit, signaling to a wireless device. The signaling includes or comprises information indicating that the wireless device can extend an active time of a DRX mode responsive to the wireless device receiving downlink signaling from the base station or another base station indicative of an upcoming data burst during a channel occupancy time, and responsive to the wireless device meeting at least one condition.

FIG. 15 illustrates a schematic block diagram of an apparatus 1500 in a wireless network (for example, the wireless network shown in FIG. 3). The apparatus may be implemented in a network node (e.g., network node 360 shown in FIG. 3). Apparatus 1500 is operable to carry out the example method described with reference to FIG. 14 and possibly any other processes or methods disclosed herein. It is also to be understood that the method of FIG. 14 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Transmitting unit 1502, and any other suitable units of apparatus 1500 to perform corresponding functions according one or more embodiments of the present disclosure.

As illustrated in FIG. 15, apparatus 1500 includes Transmitting unit 1502. The Transmitting unit 1502 is configured to transmit, or cause to transmit, signaling to a wireless device. The signaling includes or comprises information indicating that the wireless device can extend an active time of a DRX mode responsive to the wireless device receiving downlink signaling from the base station or another base station indicative of an upcoming data burst during a channel occupancy time, and responsive to the wireless device meeting at least one condition.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Various groups of exemplary embodiments are set out in the following paragraphs:

Group A Embodiments

1. A method performed by a wireless device operating in a discontinuous reception, DRX, mode having an active state and a sleep state, the method comprising:
   a. responsive to receiving downlink signaling from a base station indicative of an upcoming data burst during a channel occupancy time, and responsive to the wireless device meeting at least one condition, extending an active time of the DRX mode during which the wireless device is in the active state.
2. The method of embodiment 1 wherein the at least one condition comprises a first condition that the wireless device has not been scheduled for data transmission or reception for a first predetermined time period, and either the wireless device has first uplink data ready for transmission, or the wireless device estimates that there is first downlink data ready for reception from the base station.
3. The method of any previous embodiment wherein the at least one condition comprises a second condition that the wireless device has transmitted second uplink data to the base station within a second predetermined time period and received no downlink acknowledgment from the base station of the transmitted second uplink data.
4. The method of any previous embodiment wherein the at least one condition comprises a third condition that the wireless device has received third downlink data from the base station within a third predetermined time period and there is a pending uplink acknowledgment of the received third downlink data for the wireless device to transmit.
5. The method of any previous embodiment wherein the at least one condition comprises a fourth condition that the wireless device has been triggered for Radio Resource Control signaling.
6. The method of any previous embodiment wherein the at least one condition comprises a fifth condition that the wireless device has opportunities or occasions for uplink control signaling transmissions or downlink control signaling transmissions during the channel occupancy time.
7. The method of any previous embodiment wherein the at least one condition comprises a sixth condition that the wireless device belongs to a preconfigured group of wireless devices associated with the channel occupancy time.
8. The method of any previous embodiment wherein the at least one condition comprises a seventh condition that the wireless device has a pending data transmission of a service or traffic type associated with the channel occupancy time.
9. The method of any previous embodiment wherein the at least one condition comprises an eighth condition that the wireless device was unable to be scheduled for data transmission or reception during a last channel occupancy time.

10. The method of embodiment 1 wherein the at least one condition comprises a ninth condition that a channel access category and/or channel access priority class associated with wireless device data to be transmitted is the same as a channel access category and/or channel access priority class associated with the channel occupancy time.
11. The method of any previous embodiment wherein the at least one condition comprises a tenth condition that an identity of the wireless device is associated with the channel occupancy time.
12. The method of any previous embodiment wherein the at least one condition comprises an eleventh condition that a measured channel occupancy or a number of listen before talk failures is below a configured threshold.
13. The method as in any previous embodiment wherein the step of extending the active time of the DRX mode comprises starting or restarting a first timer indicating a number of consecutive subframes for which the wireless device should be in the active state after receiving the downlink signaling.
14. The method as in any previous embodiment wherein the step of extending the active time of the DRX mode comprises; responsive to the wireless device operating in a longer DRX cycle when receiving the downlink signaling indicative of an upcoming data burst, switching from the longer DRX cycle to a shorter DRX cycle.
15. The method as in any previous embodiment wherein the step of extending the active time of the DRX mode comprises applying a DRX configuration having a longer or more frequent second timer specifying a number of subframes for which the wireless device is in the active state for each DRX cycle.
16. The method as in any previous embodiment wherein the step of extending the active time of the DRX mode comprises remaining in the active time for the duration of the channel occupancy time.
17. The method as in any previous embodiment wherein the step of extending the active time of the DRX mode comprises remaining in the active time for the duration of a third timer that starts in response to receiving the downlink signaling indicative of the upcoming data burst.
18. The method as in any previous embodiment wherein the step of extending the active time of the DRX mode comprises extending the active time up to a configured maximum time.
19. The method as in any previous embodiments wherein the channel occupancy time is initiated by a base station.
20. The method as in any previous embodiments wherein the channel occupancy time is initiated by a wireless device.
21. The method as in any previous embodiments wherein the downlink signaling from a base station indicative of an upcoming data burst during a channel occupancy time comprises a demodulation reference signal.
22. The method of any of the previous embodiments, further comprising:
providing user data; and
forwarding the user data to a host computer via the transmission to the base station.

Group C Embodiments

23. A wireless configured to operate in a discontinuous reception, DRX, mode, the wireless device comprising:
processing circuitry configured to perform any of the steps of any of the Group A embodiments; and
power supply circuitry configured to supply power to the wireless device.
24. A user equipment (UE), the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.
25. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.
26. The communication system of the previous embodiment, wherein the cellular network further includes a base station configured to communicate with the UE.
27. The communication system of the previous 2 embodiments, wherein:
the processing circuitry of the host computer is configured to execute a host application, thereby providing the user data; and
the UE's processing circuitry is configured to execute a client application associated with the host application.
28. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.
29. The method of the previous embodiment, further comprising at the UE, receiving the user data from the base station.
30. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.
31. The communication system of the previous embodiment, further including the UE.

32. The communication system of the previous 2 embodiments, further including the base station, wherein the base station comprises a radio interface configured to communicate with the UE and a communication interface configured to forward to the host computer the user data carried by a transmission from the UE to the base station.
33. The communication system of the previous 3 embodiments, wherein:
    the processing circuitry of the host computer is configured to execute a host application; and
    the UE's processing circuitry is configured to execute a client application associated with the host application, thereby providing the user data.
34. The communication system of the previous 4 embodiments, wherein:
    the processing circuitry of the host computer is configured to execute a host application, thereby providing request data; and
    the UE's processing circuitry is configured to execute a client application associated with the host application, thereby providing the user data in response to the request data.
35. A method implemented in a communication system including a host computer, a base station and a user equipment (UE), the method comprising:
    at the host computer, receiving user data transmitted to the base station from the UE, wherein the UE performs any of the steps of any of the Group A embodiments.
36. The method of the previous embodiment, further comprising, at the UE, providing the user data to the base station.
37. The method of the previous 2 embodiments, further comprising:
    at the UE, executing a client application, thereby providing the user data to be transmitted; and
    at the host computer, executing a host application associated with the client application.
38. The method of the previous 3 embodiments, further comprising:
    at the UE, executing a client application; and
    at the UE, receiving input data to the client application, the input data being provided at the host computer by executing a host application associated with the client application,
    wherein the user data to be transmitted is provided by the client application in response to the input data.
39. A method implemented in a communication system including a host computer, a base station and a user equipment (UE), the method comprising:
    at the host computer, receiving, from the base station, user data originating from a transmission which the base station has received from the UE, wherein the UE performs any of the steps of any of the Group A embodiments.
40. The method of the previous embodiment, further comprising at the base station, receiving the user data from the UE.
41. The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

1xRTT CDMA2000 1x Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device operating in a discontinuous reception (DRX) mode having an active state and a sleep state, the method comprising: responsive to receiving downlink signaling from a base station indicative of an upcoming data burst during a channel occupancy time, and responsive to the wireless device meeting at least one condition, extending an active time of the DRX mode during which the wireless device is in the active state, wherein the at least one condition comprises:
   a condition that is met when the wireless device has a pending data transmission of a service or traffic type associated with the channel occupancy time; or
   a condition that is met when the wireless device was unable to be scheduled for data transmission or reception during a last channel occupancy time; or
   a condition that is met when a channel access category and/or channel access priority class associated with wireless device data to be transmitted is the same as a channel access category and/or channel access priority class associated with the channel occupancy time.

2. The method of claim 1 wherein the at least one condition comprises a first condition that is met when the wireless device has not been scheduled for data transmission or reception for a first predetermined time period, and either the wireless device has first uplink data ready for transmission, or the wireless device estimates that there is first downlink data ready for reception from the base station.

3. The method of claim 1 wherein the at least one condition comprises a second condition that is met when the wireless device has transmitted second uplink data to the base station and there is a pending downlink acknowledgment from the base station of the transmitted second uplink data.

4. The method of claim 1 wherein the at least one condition comprises a third condition that is met when the wireless device has received third downlink data from the base station and there is a pending uplink acknowledgment of the received third downlink data for the wireless device to transmit.

5. The method of claim 1 wherein the at least one condition comprises a fourth condition that is met when the wireless device has been triggered for Radio Resource Control signaling.

6. The method of claim 1 wherein the at least one condition comprises a fifth condition that is met when the wireless device has opportunities or occasions for uplink control signaling transmissions or downlink control signaling receptions during the channel occupancy time.

7. The method of claim 1 wherein the at least one condition comprises a sixth condition that is met when the wireless device belongs to a preconfigured group of wireless devices associated with the channel occupancy time.

8. The method of claim 1 wherein the at least one condition comprises a tenth condition that is met when an identity of the wireless device is associated with the channel occupancy time.

9. The method of claim 1 wherein the at least one condition comprises an eleventh condition that is met when a measured channel occupancy or a number of listen before talk failures is below a configured threshold.

10. The method of claim 1 wherein the step of extending the active time of the DRX mode comprises starting or restarting a first timer indicating a number of consecutive subframes for which the wireless device should be in the active state after receiving the downlink signaling.

11. The method of claim 1 wherein the step of extending the active time of the DRX mode comprises responsive to the wireless device operating in a longer DRX cycle when receiving the downlink signaling indicative of an upcoming data burst, switching from the longer DRX cycle to a shorter DRX cycle.

12. The method of claim 1 wherein the step of extending the active time of the DRX mode comprises applying a DRX configuration having a longer or more frequent second timer specifying a number of subframes for which the wireless device is in the active state for each DRX cycle.

13. The method of claim 1 wherein the step of extending the active time of the DRX mode comprises remaining in the active time for the duration of the channel occupancy time.

14. The method of claim 1 wherein the method further comprises:
   receiving signaling from the base station indicating that the wireless device can extend the active time of the DRX mode responsive to the wireless device receiving downlink signaling from a or the base station indicative of an upcoming data burst during a channel occupancy time, and responsive to the wireless device meeting at least one condition.

15. A method performed by a base station, the method comprising:
   transmitting, or causing to transmit, signaling to a wireless device, wherein the signaling includes or comprises information indicating that the wireless device can extend an active time of a discontinuous reception (DRX) mode responsive to the wireless device receiving downlink signaling from the base station or another base station indicative of an upcoming data burst during a channel occupancy time, and responsive to the wireless device meeting at least one condition, wherein the at least one condition comprises:
      a condition that is met when the wireless device has a pending data transmission of a service or traffic type associated with the channel occupancy time; or
      a condition that is met when the wireless device was unable to be scheduled for data transmission or reception during a last channel occupancy time; or
      a condition that is met when a channel access category and/or channel access priority class associated with wireless device data to be transmitted is the same as a channel access category and/or channel access priority class associated with the channel occupancy time.

16. The method of claim 15, wherein the method further comprises:
   transmitting signaling to the wireless device indicating the at least one condition to be met by the wireless device.

17. A wireless device configured to operate in a discontinuous reception (DRX) mode, the wireless device comprising:
   processing circuitry configured to: responsive to receiving downlink signaling from a base station indicative of an upcoming data burst during a channel occupancy time, and responsive to the wireless device meeting at least one condition, extend an active time of the DRX mode during which the wireless device is in the active state, wherein the at least one condition comprises:
      a condition that is met when the wireless device has a pending data transmission of a service or traffic type associated with the channel occupancy time; or
      a condition that is met when the wireless device was unable to be scheduled for data transmission or reception during a last channel occupancy time; or
      a condition that is met when a channel access category and/or channel access priority class associated with wireless device data to be transmitted is the same as a channel access category and/or channel access priority class associated with the channel occupancy time; and
   power supply circuitry configured to supply power to the wireless device.

* * * * *